(12) United States Patent
Kim et al.

(10) Patent No.: US 8,397,258 B2
(45) Date of Patent: Mar. 12, 2013

(54) IMAGE DISPLAY APPARATUS AND METHOD FOR OPERATING AN IMAGE DISPLAY APPARATUS

(75) Inventors: Gyuseung Kim, Seoul (KR); Kinam Kim, Seoul (KR); Daeyoung Jung, Seoul (KR); Sangbaek Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 12/855,401

(22) Filed: Aug. 12, 2010

(65) Prior Publication Data

US 2011/0047578 A1 Feb. 24, 2011

(30) Foreign Application Priority Data

Aug. 19, 2009 (KR) ........................ 10-2009-0076834
Oct. 22, 2009 (KR) ........................ 10-2009-0100845

(51) Int. Cl.
*G06F 13/00* (2006.01)
*G06F 3/00* (2006.01)
*H04N 5/445* (2011.01)

(52) U.S. Cl. ............................... 725/41; 725/39; 725/56
(58) Field of Classification Search .................... 725/39, 725/41, 56
See application file for complete search history.

(56) References Cited

U.S. PATENT DOCUMENTS

| 5,900,868 A | * | 5/1999 | Duhault et al. | ................. 725/42 |
| 6,020,930 A | * | 2/2000 | Legrand | ........................ 725/41 |
| 6,118,493 A | * | 9/2000 | Duhault et al. | ............... 348/564 |
| 6,147,714 A | * | 11/2000 | Terasawa et al. | ............. 348/564 |
| 6,295,646 B1 | * | 9/2001 | Goldschmidt et al. | .......... 725/41 |
| 6,405,371 B1 | * | 6/2002 | Oosterhout et al. | ............ 725/39 |
| 7,757,252 B1 | * | 7/2010 | Agasse | ........................... 725/41 |
| 7,870,583 B2 | * | 1/2011 | Kim et al. | ....................... 725/43 |
| 8,056,099 B2 | * | 11/2011 | Shanks et al. | ................... 725/41 |
| 2002/0056098 A1 | * | 5/2002 | White | ............................. 725/39 |
| 2002/0166122 A1 | * | 11/2002 | Kikinis et al. | ................... 725/56 |
| 2002/0171686 A1 | * | 11/2002 | Kamen et al. | ................. 345/850 |
| 2003/0115607 A1 | * | 6/2003 | Morioka et al. | ................ 725/61 |
| 2006/0098002 A1 | * | 5/2006 | Inoue | ............................ 345/204 |

(Continued)

FOREIGN PATENT DOCUMENTS

| JP | 2006-135866 | 5/2006 |
| KR | 10-2007-0065529 | 6/2007 |

(Continued)

OTHER PUBLICATIONS

International Search Report dated Apr. 27, 2011 for Application PCT/KR2010/005468.

*Primary Examiner* — Pankaj Kumar
*Assistant Examiner* — Mulugeta Mengesha
(74) *Attorney, Agent, or Firm* — KED & Associates, LLP

(57) ABSTRACT

A method and an apparatus may provide thumbnail images for a display. A plurality of thumbnail images may be generated based on television channels that have been tuned during a first prescribed time period. A channel list including the plurality of thumbnail images may be provided for output to a display. At least one additional thumbnail image may be generated based on at least one additional television channel that has been tuned during a second time period, the second time period being a time period subsequent to the first time period. The channel list may be updated to further include the at least one additional thumbnail image with the plurality of thumbnail images. The updated channel list may be output to a display.

25 Claims, 15 Drawing Sheets

U.S. PATENT DOCUMENTS

| | | | | |
|---|---|---|---|---|
| 2006/0143652 | A1* | 6/2006 | Chung | 725/43 |
| 2006/0239646 | A1* | 10/2006 | Kang | 386/95 |
| 2007/0050813 | A1* | 3/2007 | Lee | 725/40 |
| 2007/0141980 | A1* | 6/2007 | Lee et al. | 455/3.06 |
| 2007/0204297 | A1* | 8/2007 | Gonzalez | 725/41 |
| 2009/0260035 | A1* | 10/2009 | Yang | 725/44 |
| 2010/0083316 | A1* | 4/2010 | Togashi et al. | 725/41 |
| 2010/0125874 | A1* | 5/2010 | Ahn et al. | 725/41 |
| 2010/0186045 | A1* | 7/2010 | Bae et al. | 725/56 |
| 2011/0083148 | A1* | 4/2011 | Sakaguchi et al. | 725/39 |

FOREIGN PATENT DOCUMENTS

KR    10-2007-0081666    8/2007

* cited by examiner

IMAGE DISPLAY APPARATUS AND METHOD FOR OPERATING AN IMAGE DISPLAY APPARATUS

CROSS-REFERENCE TO RELATED APPLICATIONS

This application claims priority benefit from Korean Patent Application No. 2009-0076834, filed Aug. 19, 2009 and Korean Patent Application No. 2009-0100845, filed Oct. 22, 2009, the subject matters of which are incorporated herein by reference.

BACKGROUND

1. Field

Embodiments may relate to an image display apparatus and a method for operating an image display apparatus. More particularly, embodiments may relate to an image display apparatus and an operation method therefor that may enable a user to select a channel.

2. Background

An image display apparatus may display images viewable to a user. The image display apparatus may display a broadcasting program selected by the user on a display from among broadcasting programs transmitted from broadcasting stations. A trend in broadcasting is a shift from analog broadcasting to digital broadcasting.

Digital broadcasting may offer many advantages over analog broadcasting such as robustness against noise, less data loss, ease of error correction, and/or the ability to provide high-definition, clear images. Digital broadcasting may also allow interactive services for viewers.

As broadcast channels increase in number to meet user demands, it may become more difficult for viewers to determine what programs they are watching as they switch through channels. Therefore, time may be taken to select a channel.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments of the present invention may be described below with reference to the attached drawings.

The terms "module" and "portion" attached to describe names of components/elements may be used herein to help understanding of the components/elements and thus may not be considered as having specific meanings or roles. Accordingly, the terms "module" and "portion" may be interchangeable in their use.

For ease of discussion, the following may relate to broadcast signals. Other or similar signals may be used such as television signals, a cable signal and/or any type of received signal from a content provider or a cable provider.

Figure 1:
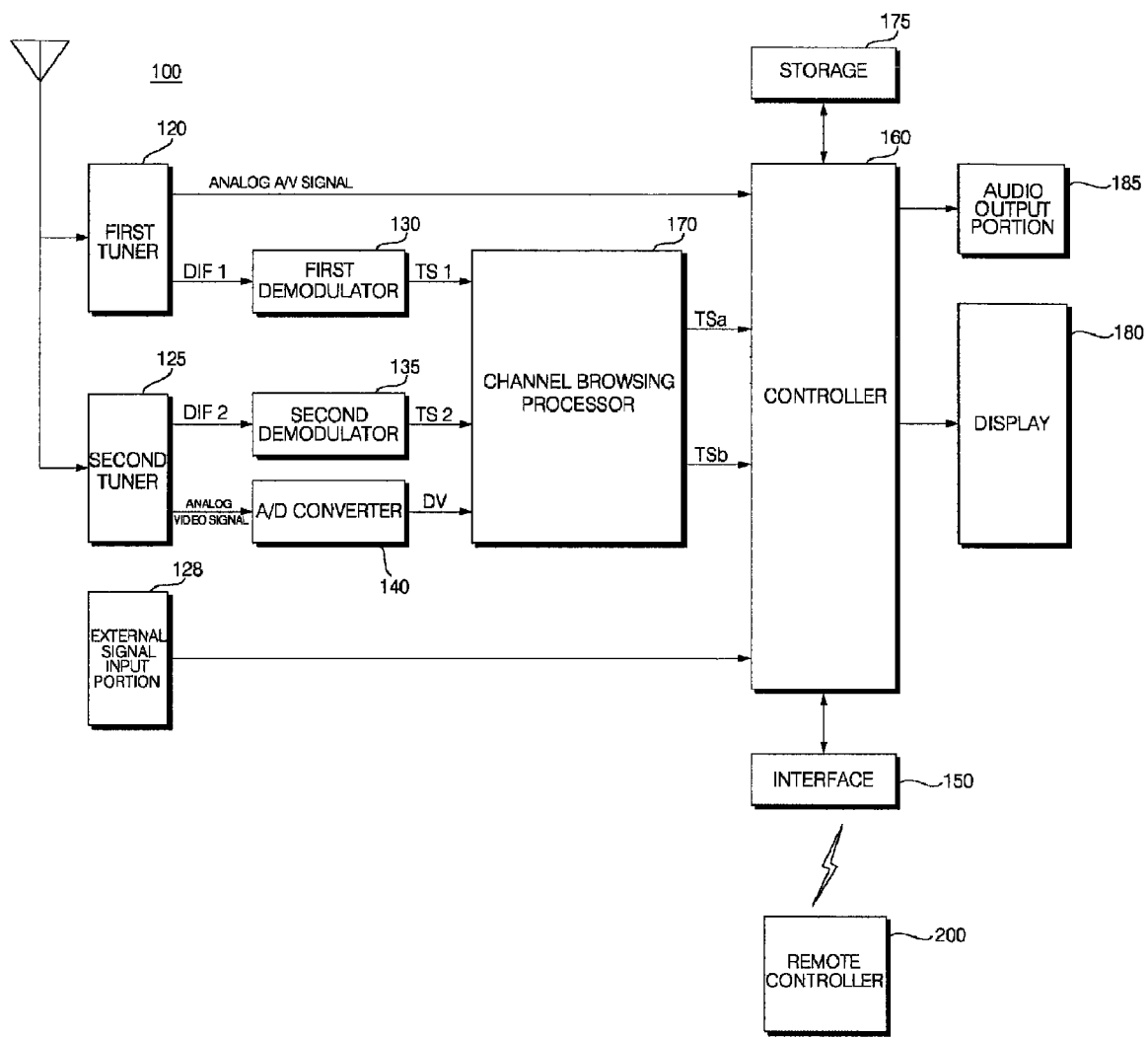
FIG. 1 is a block diagram of an image display apparatus according to an exemplary embodiment of the present invention.

FIG. 1 is a block diagram of an image display apparatus according to an exemplary embodiment of the present invention. Other embodiments and configurations are also within the scope of the present invention.

As shown in FIG. 1, an image display apparatus 100 may include a first tuner 120, a second tuner 125, an external signal input portion 128, a first demodulator 130, a second demodulator 135, an Analog-to-Digital (A/D) converter 140, an interface 150, a controller 160, a channel browsing processor 170, a storage 175 (or memory), a display 180, and/or an audio output portion 185.

The first tuner 120 may select a Radio Frequency (RF) broadcast signal corresponding to a channel selected by a user from among a plurality of RF broadcast signals received through an antenna and downconvert the selected RF broadcast signal to a digital Intermediate Frequency (IF) signal or an analog baseband Audio/Video (A/V) signal. More specifically, if the selected RF broadcast signal is a digital broadcast signal, the first tuner 120 may downconvert the selected RF broadcast signal to a digital IF signal DIF 1. If the selected RF broadcast signal is an analog broadcast signal, the first tuner 120 may downconvert the selected RE broadcast signal to an analog baseband A/V signal CVBS 1/SIF. The first tuner 120 may be a hybrid tuner capable of processing not only digital broadcast signals but also analog broadcast signals. The analog baseband A/V signal CVBS 1/SIF may be directly input to the controller 160.

The first tuner 120 may receive RF broadcast signals from an Advanced Television Systems Committee (ATSC) single-carrier system and/or from a Digital Video Broadcasting (DVB) multi-carrier system, as may be described below.

The second tuner 125, like the first tuner 120, may select the RF broadcast signal corresponding to the channel selected by the user from among the plurality of RF broadcast signals received through the antenna, and may downconvert the selected RF broadcast signal to a second digital IF signal DIF 2 or an analog baseband A/V signal CVBS 2/SIF.

The second tuner 125 may sequentially or periodically select a number of RF broadcast signals corresponding to a number of broadcast channels previously memorized in the image display apparatus 100 by a channel-add function from among a plurality of RF signals received through the antenna, and may downconvert the selected RF broadcast signals to IF signals or baseband A/V signals. One or more video frames acquired from each of the preliminarily memorized channels may be displayed on at least a part of the display 180 as a thumbnail image. Thus, the RF broadcast signals corresponding to all of the preliminarily memorized channels may be sequentially or periodically received.

For example, the first tuner 120 may downconvert a main RF broadcast signal selected by the user to an IF signal or a baseband A/V signal, and the second tuner 125 may sequentially or periodically select all RF broadcast signals or all other RF broadcast signals (i.e., sub-RF broadcast signals) except for the main RF broadcast signal and downconvert the selected RF broadcast signals to IF signals or baseband A/V signals.

The first demodulator 130 may receive the first digital IF signal DIF 1 from the first tuner 120 and may demodulate the first digital IF signal DIF 1.

For example, if the first digital IF signal DIF 1 is an ATSC signal, the first demodulator 130 may perform 8-Vestigal SideBand (VSB) demodulation on the first digital IF signal DIF 1. The first demodulator 130 may also perform channel decoding. For the channel decoding, the first demodulator 130 may include a Trellis decoder (not shown), a de-interleaver (not shown) and a Reed-Solomon decoder (not shown) and/or may perform Trellis decoding, de-interleaving and Reed-Solomon decoding.

For example, if the first digital IF signal DIF 1 is a DVB signal, the first demodulator 130 may perform Coded Orthogonal Frequency Division Multiple Access (COFDMA) demodulation on the first digital IF signal DIF 1. The first demodulator 130 may also perform channel decoding. For the channel decoding, the first demodulator 130 may include a convolution decoder (not shown), a de-interleaver (not shown), and a Reed-Solomon decoder (not shown) and/or may perform convolution decoding, de-interleaving, and/or Reed-Solomon decoding.

The external signal input portion 128 may receive signals from an external device. For reception of the external input signals, the external signal input portion 128 may include an A/V Input/Output (I/O) portion (not shown) and a wireless communication module (not shown).

The external signal input portion 128 may be connected to an external device such as a Digital Versatile Disc (DVD), a Bluray disc, a gaming device, a camcorder, and/or a computer (e.g., a laptop computer). The external signal input portion 128 may externally receive video, audio, and/or data signals from the external device and transmit the received external input signals to the controller 160. The external signal input portion 128 may output video, audio, and/or data signals processed by the controller 160 to the external device.

In order to receive or transmit A/V signals from or to the external device, the A/V I/O portion of the external signal input portion 128 may include an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, a D-sub port, an Institute of Electrical and Electronics Engineers (IEEE)-1394 port, a Sony/Philips Digital Interconnect Format (S/PDIF) port, and/or a LiquidHD port.

Input signals received through the external signal input portion 128 may be input to the channel browsing processor 170 and may be subjected to a channel browsing operation performed by the channel browsing processor 170 for extracting a number of thumbnail images. For example, analog signals received through the CVBS port and the S-video port may be converted into digital signals by the A/D converter 140 and then input to the channel browsing processor 170. Digital signals received through the Ethernet port, the USB port, the component port, the DVI port, the HDMI port, the RGB port, the D-sub port, the IEEE-1394 port, the S/PDIF port and/or the LiquidHD port may be directly input to the channel browsing processor 170 without the need for ND conversion. A digital signal output from the external signal input portion 128 may be a stream signal, for example, an MPEG-2 Transport Stream (TS) in which an MPEG-2 video signal and a Dolby AC-3 audio signal are multiplexed.

The wireless communication module of the external signal input portion 128 may wirelessly access the Internet. For the wireless Internet access, the wireless communication module may use a Wireless Local Area Network (WLAN) (i.e., Wi-Fi), Wireless Broadband (Wibro), World Interoperability for Microwave Access (WiMax), and/or High Speed Downlink Packet Access (HSDPA).

The wireless communication module may perform short-range wireless communication with other electronic devices. For the short-range wireless communication, the wireless communication module may use Bluetooth, Radio-Frequency IDentification (RFID), Infrared Data Association (IrDA), Ultra WideBand (UWB), and/or ZigBee.

The external signal input portion 128 may be connected to one of various set-top boxes through at least one of the Ethernet port, the USB port, the CVBS port, the component port, the S-video port, the DVI port, the HDMI port, the RGB port, the D-sub port, the IEEE-1394 port, the S/PDIF port, and/or the liquid HD port and may thus receive data from or transmit data to the various set-top boxes. For example, when connected to an Internet Protocol Television (IPTV) set-top box, the external signal input portion 128 may transmit video, audio and/or data signals processed by the IPTV set-top box to the controller 160 and may transmit various signals received from the controller 160 to the IPTV set-top box. Video, audio and/or data signals processed by the IPTV set-top box may be processed by the channel browsing processor 170 and the controller 160.

The term 'IPTV' as used herein may cover a broad range of services, depending on transmission networks, such as Asynchronous Digital Subscriber Line-TV (ADSL-TV), Very High Speed Digital Subscriber Line-TV (VDSL-TV), Fiber To The Home-TV (FTTH-TV), TV over Digital Subscriber Line (DSL), TV over IP (TVIP), Broadband TV (BTV), and Internet TV and full-browsing TV, which are capable of providing Internet-access services.

The first demodulator 130 may perform demodulation and channel decoding on the first digital IF signal DIF 1 received from the first tuner 120, thereby obtaining a first stream signal TS 1. The first stream signal TS 1 may be a signal in which a video signal, an audio signal and a data signal are multiplexed. For example, the first stream signal TS 1 may be an MPEG-2 TS signal obtained by multiplexing an MPEG-2 video signal and a Dolby AC-3 audio signal. An MPEG-2 TS signal may include a 4-byte header and a 184-byte payload.

The first stream signal TS 1 may be input to the controller 160 and may thus be subjected to demultiplexing and signal processing. The first stream signal TS 1 may be input to the channel browsing processor 170 and may thus be subjected to a channel browsing operation prior to input to the controller 160. The channel browsing operation may be described below in further detail.

In order to properly handle not only ATSC signals but also DVB signals, the first demodulator 130 may include an ATSC demodulator and a DVB demodulator.

The second demodulator 135 may receive the second digital IF signal DIF 2 from the second tuner 125 and may demodulate the second digital IF signal DIF 2, thereby generating a second stream signal TS 2. Operation of the second demodulator 135 may be almost the same as operation of the first demodulator 130.

An analog baseband video signal CVBS 2 output from the second tuner 125 may need to be digitized by the ND converter 140.

The A/D converter 140 may convert a received analog signal to a digital signal. If the received analog signal is a video signal, the A/D converter 140 may perform sampling and quantization on the analog signal, thereby obtaining the digital video signal DV. The digital video signal DV may be a signal yet to be encoded. The digital video signal DV may be provided to the channel browsing processor 170, for processing.

The interface 150 may transmit a signal received from the user to the controller 160 or may transmit a signal received from the controller 160 to the user. For example, the interface 150 may receive user input signals such as a power-on/off signal, a channel selection signal, and/or a screen setting signal from a remote controller 200 (or a pointing device) or may transmit a signal received from the controller 160 to the remote controller 200 (or the pointing device).

The controller 160 may demultiplex an input stream signal into a number of signals and process the demultiplexed signals so that the processed signals can be output as A/V data. The controller 160 may provide overall control of the image display apparatus 100.

The controller 160 may include a demultiplexer (not shown), a video processor (not shown), an audio processor (not shown), and/or a user input processor (not shown).

The controller 160 may demultiplex an input stream signal (e.g. an MPEG-2 TS signal) into a video signal, an audio signal and/or a data signal.

The controller 160 may process the video signal. For example, if the video signal is an encoded signal, the controller 160 may decode the video signal. More specifically, if the video signal is an MPEG-2 encoded signal, the controller 160 may decode the video signal by MPEG-2 decoding. If the video signal is an H.264-encoded DMB or DVB-handheld (DVB-H) signal, the controller 160 may decode the video signal by H.264 decoding.

The controller 160 may adjust brightness, tint and/or color of the video signal.

The video signal processed by the controller 160 may be displayed on the display 180. The video signal processed by the controller 160 may be output to an external output port connected to an external device (or external output device).

The controller 160 may process the audio signal obtained by demultiplexing the input stream signal. For example, if the audio signal is an encoded signal, the controller 160 may decode the audio signal. More specifically, if the audio signal is an MPEG-2 encoded signal, the controller 160 may decode the audio signal by MPEG-2 decoding. If the audio signal is an MPEG-4 Bit Sliced Arithmetic Coding (BSAC)-encoded terrestrial DMB signal, the controller 160 may decode the audio signal by MPEG-4 decoding. If the audio signal is an MPEG-2 Advanced Audio Coding (AAC)-encoded DMB or DVB-H signal, the controller 180 may decode the audio signal by AAC decoding.

The controller 160 may adjust base, treble and/or sound volume of the audio signal.

The audio signal processed by the controller 160 may be output to the audio output portion 185 (e.g., a speaker). The audio signal processed by the controller 160 may also be output to an external output port connected to an external device (or external output device).

The controller 160 may process the data signal obtained by demultiplexing the input stream signal. For example, if the data signal is an encoded signal such as an Electronic Program Guide (EPG), which is a guide to scheduled broadcast TV or radio programs, the controller 160 may decode the data signal. Examples of an EPG include ATSC-Program and System Information Protocol (PSIP) information and/or DVB-Service Information (SI). ATSC-PSIP information or DVB-SI information may be included in the header of a TS (i.e., a 4-byte header of an MPEG-2 TS).

The controller 160 may perform On-Screen Display (OSD) processing. More specifically, the controller 160 may generate an OSD signal for displaying various pieces of information on the display 180, such as graphic or text data, based on a user input signal received from the remote controller 200 and at least one of a processed video signal and/or a processed data signal. The OSD signal may be input to the display 180 along with the processed video and data signals.

The OSD signal may include various data such as a User-Interface (UI) screen, various menu screens, widgets, and/or icons for the image display apparatus 100.

The channel browsing processor 170 may perform channel browsing on at least one of a plurality of broadcast signals corresponding to a plurality of received channels, input image signals received from the external signal input portion 128, and/or both. More specifically, the channel browsing processor 170 may receive the first or second stream signal TS 1 or TS 2 from the first or second demodulator 130 or 135, a stream signal from the external signal input portion 128, or the digital signal DV from the A/D converter 140, demultiplex the first or second stream signal TS 1 or TS 2, and extract some of the frames of a video signal obtained by the demultiplexing. The channel browsing processor 170 may generate or provide a new TS signal, (i.e., a sub-stream signal TSa) by multiplexing a video signal including the extracted video frames. For example, the sub-stream signal TSa and a main-stream signal TSb may both be MPEG-2 TS signals.

The channel browsing processor 170 may output the main-stream signal TSb, which corresponds to a main video signal to be displayed in a main region of the display 180, without any processing. On the other hand, the channel browsing processor 170 may perform channel browsing on a sub-video signal, which is to be displayed in a sub-region of the display 180, thereby obtaining the sub-stream signal TSa.

The channel browsing processor 170 may extract some of the video frames of each of a plurality of broadcast signals (or television signals) received through a plurality of channels and re-encode the extracted video frames into a TS, thereby displaying a list of the channels on the display 180. Since the extracted video frames are displayed on the display 180 as thumbnail images, the user may intuitively identify contents of broadcast programs received through the plurality of channels.

The channel browsing processor 170 may extract some of the video frames of each of various external input signals received from the external signal input portion 128 and re-encode the extracted video frames into a stream, thereby displaying an external input image list (or external image list) on the display 180. A list of a plurality of external input image signals received from a plurality of external devices (or external input devices) may be displayed on the display 180 as a list of thumbnail images. Therefore, the user may intuitively identify the external input signals received from the external devices based on the external input image list.

The channel browsing processor 170 may extract some of the video frames of each of a plurality of broadcast signals (or television signals) received through a plurality of channels and some of the video frames of each of various external input signals received from the external signal input portion 128 and re-encode the extracted video frames into TSs, thereby displaying a channel list and an external input image list on the display 180. Since the extracted video frames are displayed on the display 180 as a list of thumbnail images, the user may intuitively identify contents of broadcast programs received through the plurality of channels and the external input signals received from the external devices.

Structure and operation of the channel browsing processor 170 may be described below in further detail with reference to FIG. 2.

The storage 175 may store various programs for processing and controlling signals by the controller 160, and may also store processed video, audio and/or data signals.

The storage 175 may temporarily store a video, audio and/or data signal received from the external signal input portion 128.

The storage 175 may memorize broadcast channels by a channel-add function.

The storage 175 may include, for example, at least one of a flash memory-type storage medium, a hard disc-type storage medium, a multimedia card micro-type storage medium, a card-type memory, a Random Access Memory (RAM) and/or a Read-Only Memory (ROM) such as an Electrically Erasable Programmable ROM (EEPROM).

FIG. 1 shows the storage 175 configured separately from the controller 160, although embodiments of the present invention are not so limited. The storage 175 may be incorporated into the controller 160, for example.

The image display apparatus 100 may play a file (such as a moving picture file, a still image file, a music file, and/or a text file) stored in the storage 175 to the user.

The display 180 may convert a processed video signal, a processed data signal, and an OSD signal received from the controller 160 or a video signal and a data signal received from the external signal input portion 128 to RGB signals, thereby generating driving signals. The display 180 may be implemented into various types of displays such as a Plasma Display Panel (PDP), a Liquid Crystal Display (LCD), an Organic Light Emitting Diode (OLED), a flexible display, and/or a three-dimensional (3D) display. The display 180 may also be implemented as a touch screen so that it may be used not only as an output device but also as an input device.

The audio output portion 185 may receive a processed audio signal (e.g., a stereo signal, a 3.1-channel signal or a 5.1-channel signal) from the controller 160 and output the received audio signal as voice. The audio output portion 185 may be implemented as one of various types of speakers.

The remote controller 200 may transmit a user input to the interface 150. For the transmission of a user input, the remote controller 200 may use various communication techniques such as Bluetooth, RF, IR, UWB and/or ZigBee.

The remote controller 200 may receive a video signal, an audio signal and a data signal from the interface 150 and may output the received signals.

The remote controller 200 may be a pointing device. A pointing device may be described in further detail with reference to FIGS. 3A and 3B.

If the external signal input portion 128 is connected to a cable TV set-top box (not shown), the image display apparatus 100 may further include a divider (not shown) to distinguish a broadcast signal received from the first tuner 120 or the second tuner 125 from a broadcast signal received from the cable TV set-top box.

The set-top box may be connected to the external signal input portion 128 via the HDMI port. A thumbnail image may be created in relation to a broadcast signal of the scrambled channel by processing the broadcast signal in the first tuner 120 or the second tuner 125 and then in the channel browsing processor 170.

Since the broadcast signal is scrambled, the thumbnail image may not be based on an image of the broadcast signal. Rather, the thumbnail image may include at least one of broadcast information based on EPG information being data information and a scramble icon. As even the thumbnail image corresponding to the broadcast signal of the scrambled channel is displayed in a thumbnail list, the user may easily select a channel.

While FIG. 1 shows two tuners for use in displaying a thumbnail list including thumbnail images on the display 180 when the user wants to view a channel list, embodiments of the present invention are not so limited. Exemplary embodiments may be implemented with use of a single tuner.

For example, when a channel list display command is issued during receiving a broadcast signal (or television signal) on a selected channel through the single tuner, broadcast signals of all of broadcast channels previously memorized by a channel-add function may be sequentially or periodically received through the single tuner. The channel list may be displayed in a full-view mode.

The image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs and/or may be a mobile digital broadcast receiver capable of receiving at least one of terrestrial DMB broadcast programs, satellite DMB broadcast programs, ATSC-M/H broadcast programs, DVB-H (COFDM) broadcast programs, and/or Media Forward Link Only (MediaFLO) broadcast programs. Alternatively, the image display apparatus 100 may be a digital broadcast receiver capable of receiving cable broadcast programs, satellite broadcast programs and/or IPTV programs.

Examples of the image display apparatus 100 may include a TV receiver, a mobile phone, a smart phone, a laptop computer, a digital broadcast receiver, a Personal Digital Assistant (PDA) and/or a Portable Multimedia Player (PMP).

Various components shown in FIG. 1 may be provided in a set-top box and other components may be provided in a display device. As one example, the set-top box may include any of the following components: the first tuner 120, the second tuner 125, the external signal input portion 128, the first demodulator 130, the second demodulator 135, the A/D converter 140 and/or the channel browsing processor 170. As one example, the display device may include any of the following components: the storage 175, the interface 150, the controller 160, the audio output portion 185 and/or the display 180.

Figure 2:
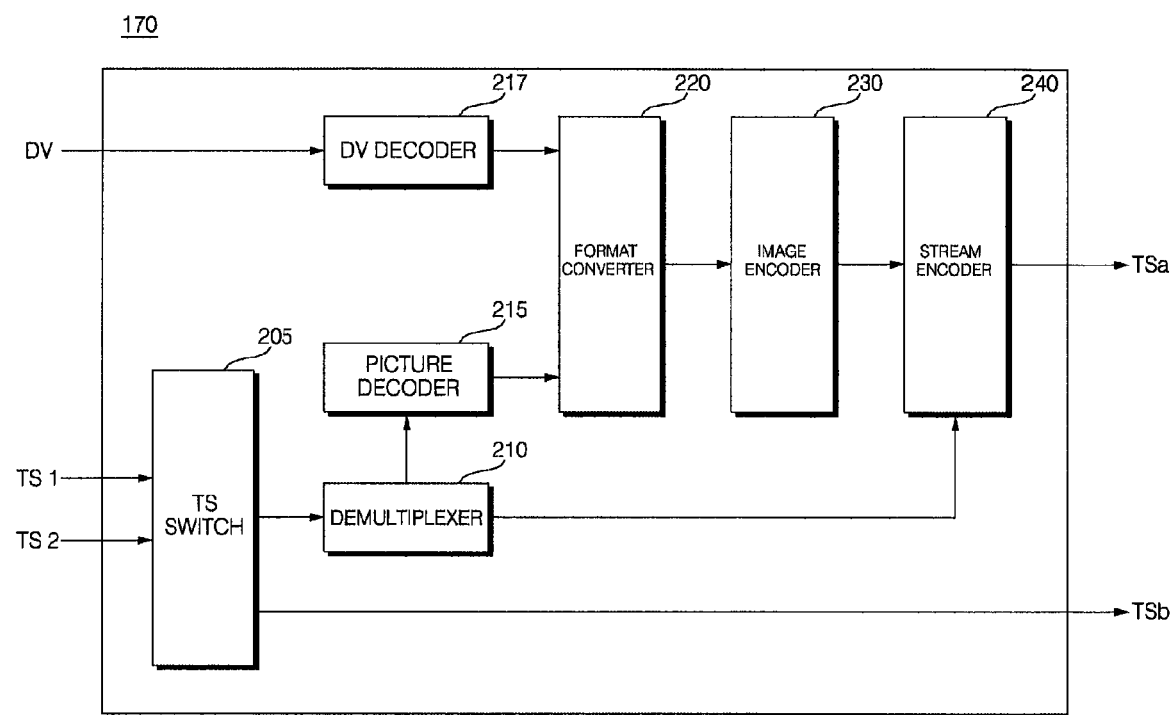
FIG. 2 is a block diagram of a channel browsing processor shown in FIG. 1.

FIG. 2 is a block diagram of the channel browsing processor 170 shown in FIG. 1.

As shown in FIG. 2, the channel browsing processor 170 may include a TS switch 205, a demultiplexer 210, a picture decoder 215, a DV decoder 217, a format converter 220, an image encoder 230 (or video encoder) and/or a stream encoder 240.

The TS switch 205 may select one of the first and second stream signals TS 1 and TS 2, output the selected stream signal as the main-stream signal TSb without any processing, and transmit the other stream signal to the demultiplexer 210 as a sub-stream signal. The main-stream signal, which corresponds to a main video signal, may be displayed on almost an entire area of the display 180. The sub-stream signal, which corresponds to a sub-video signal, may be displayed only on a particular part of the display 180.

A channel list, an external input image list and/or both may be displayed in a compact-view mode in a particular area on the display 180.

The demultiplexer 210 may demultiplex the first or second stream signal TS 1 or TS 2 into a video signal, an audio signal and/or a data signal, output the video signal to the picture decoder 215, and output the audio signal and the data signal to the stream encoder 240 in order for the stream encoder 240 to generate or provide a new stream signal.

The picture decoder 215 may decode at least some of the frames of the received video signal by MPEG-2 decoding, MPEG-4 decoding and/or H.264 decoding. The decoded frames may be still images or moving pictures. For example, the picture decoder 215 may decode an Intra-coded (I) frame or some section of the received video signal.

The DV decoder 217 may receive the digital signal DV from the A/D converter 140 and may acquire a digital image signal from the digital signal DV.

The format converter 220 may convert the format of a video signal received from the picture decoder 215 or the DV decoder 217. For example, the format converter 220 may change a size (or resolution) of the input image signal. The size change may depend on the number of thumbnail images in a thumbnail list displayed on the display 180. Especially upon receipt of a command to change the number of thumbnail images, a size of thumbnail images to be displayed may be changed based on the changed number of thumbnail images. For example, as the number of thumbnail images increases, the size of the thumbnail images may decrease.

The format converter 220 may convert the input image signal to a different size based on whether the input image signal is to be displayed in a compact-view mode or in a full-view mode. The size of thumbnail images displayed in the full-view mode may be greater than the size of thumbnail images displayed in the compact-view mode. A channel list, an external input image list and/or both may be displayed on the display 180 either in the compact-view mode or in the full-view mode.

The image encoder 330 may encode the image signal received from the format converter 220 by JPEG encoding or MPEG-2 encoding. Still images or moving pictures encoded by the image encoder 230 may be displayed on the display 180 as thumbnail images.

The stream encoder 240 may re-encode or multiplex an encoded video signal received from the image encoder 230 and the audio and data signals obtained by the demultiplexing performed in the demultiplexer 210 into a stream, for example, an MPEG-2 TS.

The channel browsing processor 170 may extract some of the video frames of each of a plurality of broadcast signals (or television signals) and a plurality of external input signals and re-encode the extracted video frames. The re-encoded images may be displayed on the display 180 as thumbnail images in response to a user input requesting the display of a channel list or an external input image list. The user may intuitively identify contents of broadcast programs received from various channels or external input signals provided by various external devices (or various external input devices).

Figure 3A:
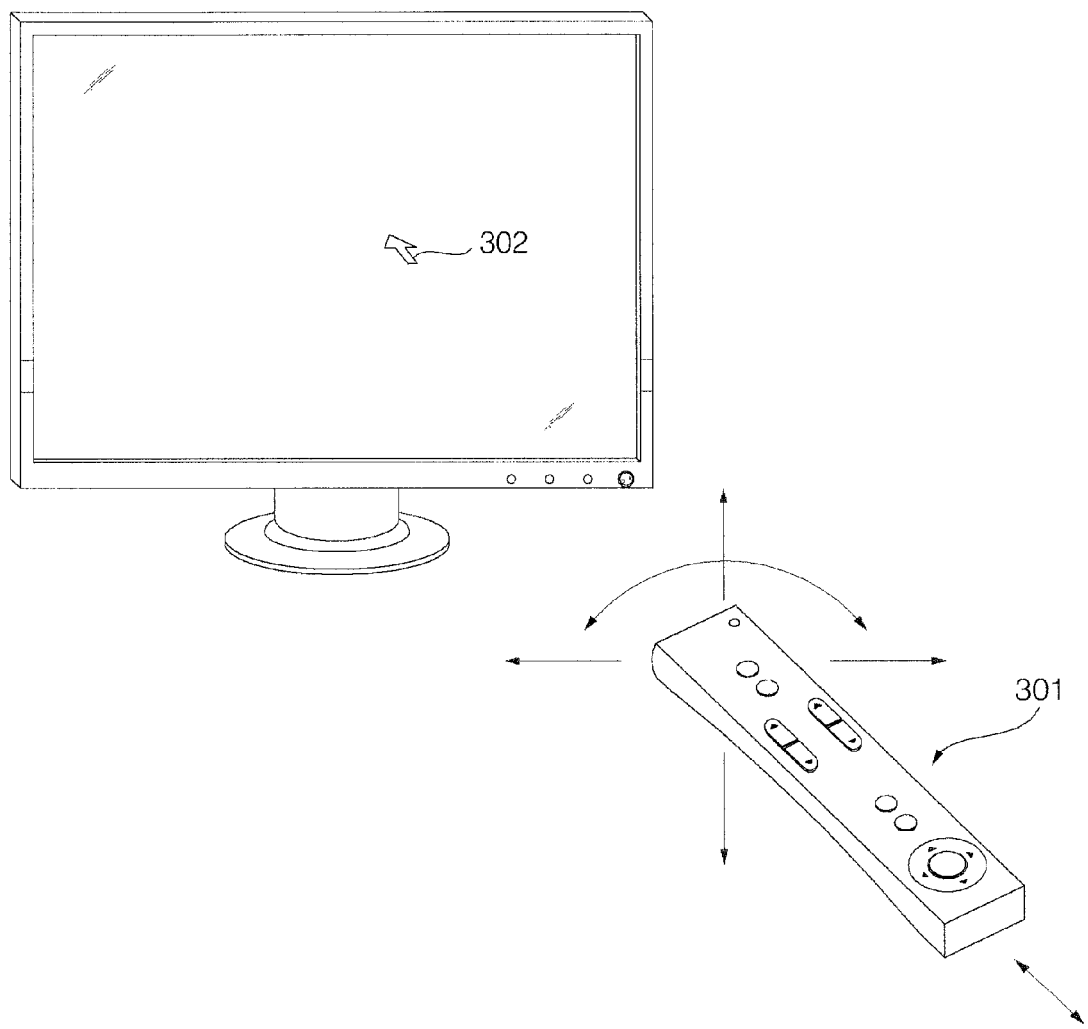
FIGS. 3A and 3B are diagrams illustrating examples of a remote controller shown in FIG. 1.
Figure 3B:
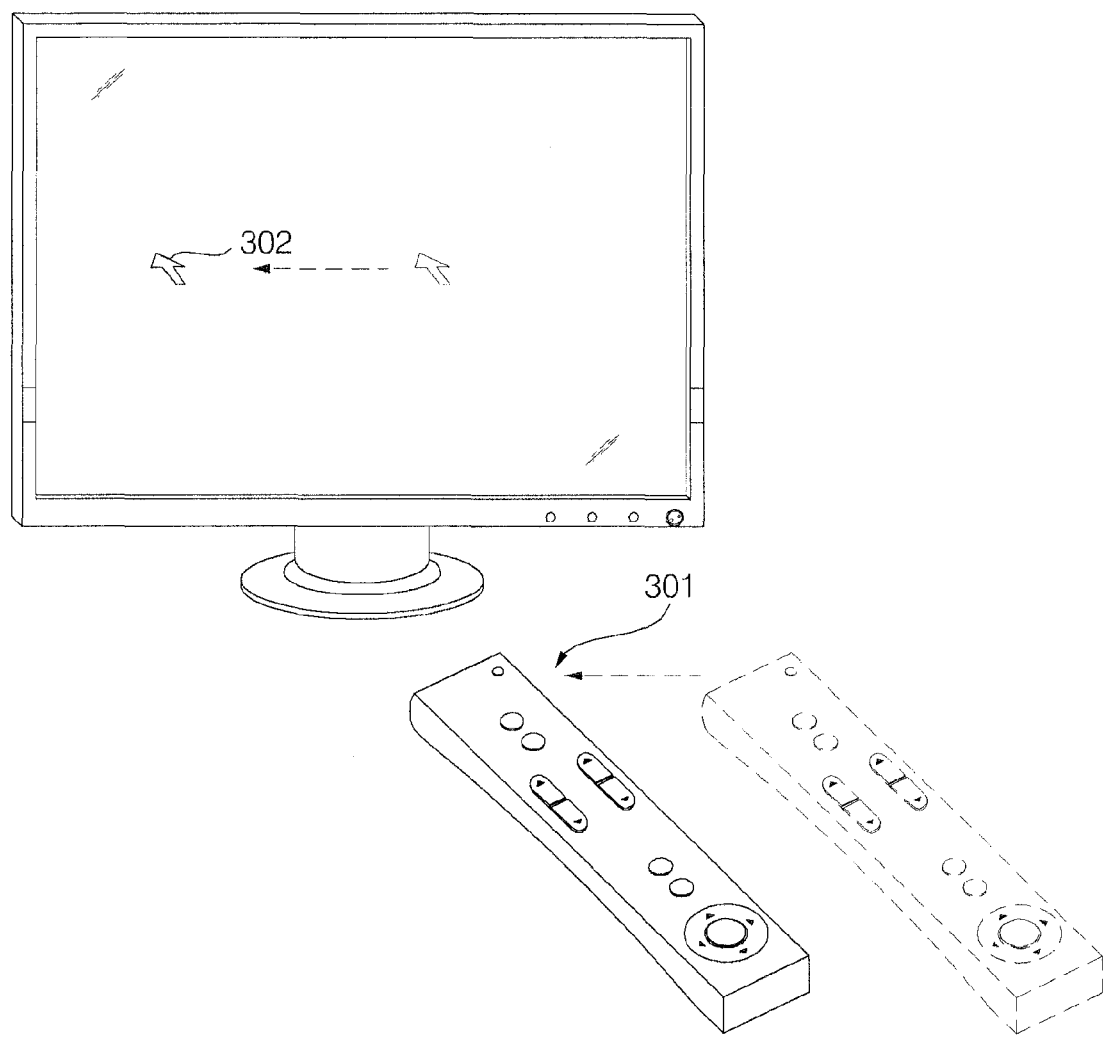

FIGS. 3A and 3B illustrate examples of the remote controller 200 shown in FIG. 1.

As shown in FIGS. 3A and 3B, the remote controller 200 may be a pointing device 301. The pointing device 301 may transmit or receive RF signals to or from the image display apparatus 100 according to an RF communication standard. As shown in FIG. 3A, a pointer 302 representing movement of the pointing device 301 may be displayed on the image display apparatus 100.

The user may move the pointing device 301 up and down, back and forth, and side to side and/or may rotate or move the pointing device 301. The pointer 302 may move in accordance with movement of the pointing device 301, as shown in FIG. 3B.

As shown in FIG. 3A, if the user moves the pointing device 301 to the left, the pointer 302 may move to the left accordingly. The pointing device 301 may include a sensor capable of detecting motions. The sensor of the pointing device 301 may detect the movement of the pointing device 301 and may transmit motion information corresponding to a result of the detection to the image display apparatus 100. The image display apparatus 100 may determine movement of the pointing device 301 based on the motion information received from the pointing device 301, and calculate coordinates of a target point to which the pointer 302 should be shifted in accordance with the movement of the pointing device 301 based on a result of a determination.

As shown in FIGS. 3A and 3B, the pointer 302 may move according to a vertical movement, a horizontal movement, and/or a rotation of the pointing device 301. The moving speed and direction of the pointer 302 may correspond to the moving speed and direction of the pointing device 301.

The pointer 302 may move in accordance with movement of the pointing device 301. Alternatively, an operation command may be input to the image display apparatus 100 in response to the movement of the pointing device 301. That is, as the pointing device 301 moves back and forth, an image displayed on the image display apparatus 100 may be gradually enlarged or reduced. This exemplary embodiment does not limit the scope and spirit of other embodiments of the present invention.

Figure 4:
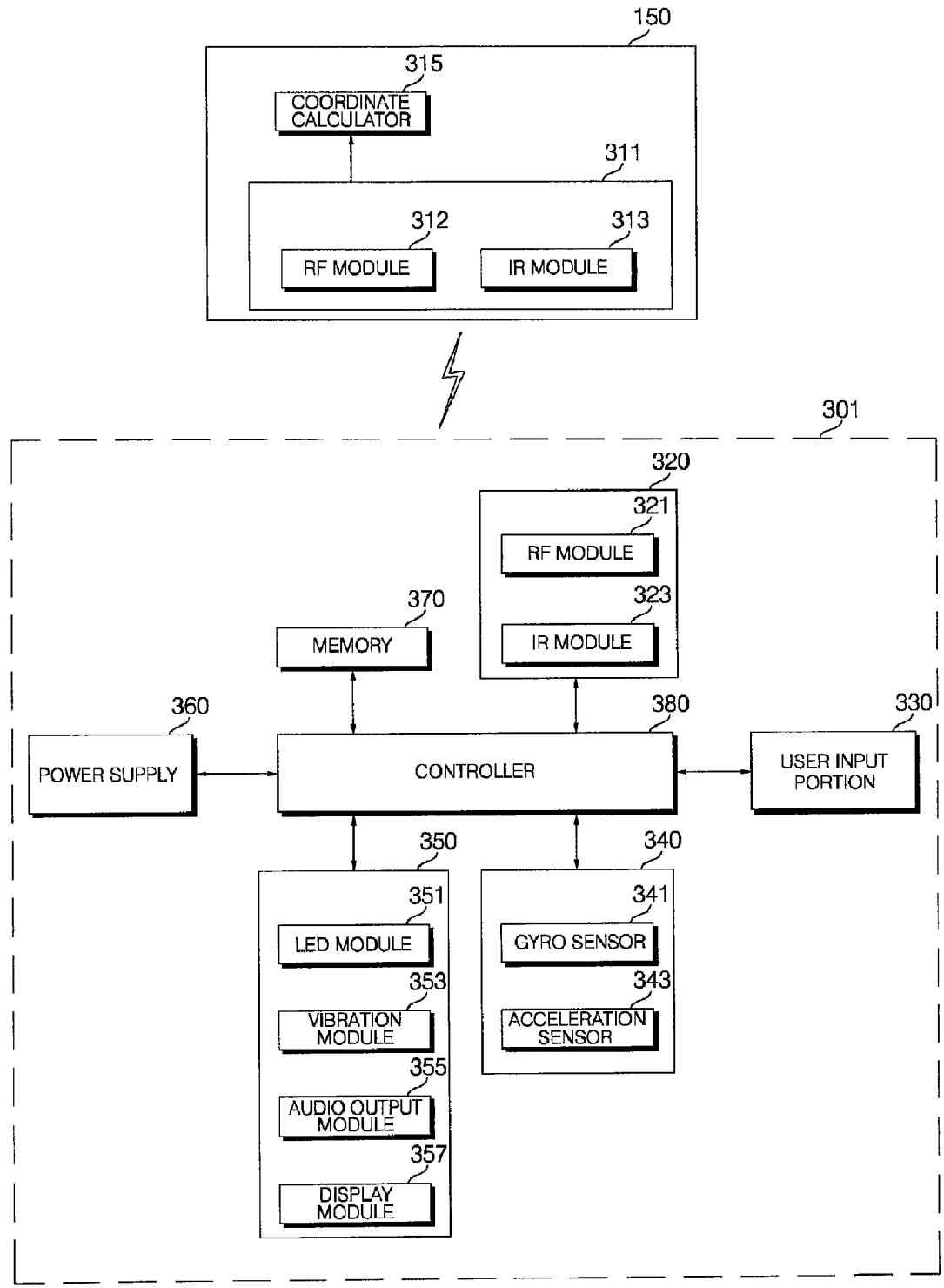
FIG. 4 is a block diagram of a user Input/Output (I/O) portion in an interface shown in FIG. 1 and a pointing device shown in FIGS. 3A and 3B.

FIG. 4 is a detailed block diagram of the pointing device 301 shown in FIGS. 3A and 3B and the interface 150 shown in FIG. 1. As shown in FIG. 4, the pointing device 301 may include a wireless communication module 320, a user input portion 330, a sensor portion 340, an output portion 350, a power supply 360, a memory 370, and/or a controller 380.

The wireless communication module 320 may transmit signals to and/or receive signals from the image display apparatus 100. The wireless communication module 320 may include an RF module 321 for transmitting RF signals to and/or receiving RF signals from the interface 150 of the image display apparatus 100 according to an RF communication standard. The wireless communication module 320 may also include an IR module 323 for transmitting IR signals to and/or receiving IR signals from the interface 150 of the image display apparatus 100 according to an IR communication standard.

The pointing device 301 may transmit motion information regarding its movement to the image display apparatus 100 through the RF module 321. The pointing device 301 may also receive signals from the image display apparatus 100 through the RF module 321. The pointing device 301 may transmit commands to the image display apparatus 100 through the IR module 323, when needed, such as a power on/off command, a channel switching command, and/or a sound volume change command.

The user input portion 330 may include a keypad and/or a plurality of buttons. The user may enter commands to the image display apparatus 100 by manipulating the user input portion 330. If the user input portion 330 includes a plurality of hard-key buttons, the user may input various commands to the image display apparatus 100 by pressing the hard-key buttons. If the user input portion 330 includes a touch screen displaying a plurality of soft keys, the user may input various commands to the image display apparatus 100 by touching the soft keys. The user input portion 330 may also include various input tools other than those set forth herein, such as a scroll key and/or a jog key. Other embodiments and/or arrangements may also be provided.

The sensor portion 340 may include a gyro sensor 341 and/or an acceleration sensor 343. The gyro sensor 341 may sense movement of the pointing device 301, for example, in X-, Y-, and Z-axis directions, and the acceleration sensor 343 may sense a moving speed of the pointing device 301.

The output portion 350 may output a video and/or audio signal corresponding to a manipulation of the user input portion 330 or a signal transmitted by the image display apparatus 100. The user may easily identify whether the user input portion 330 has been manipulated or whether the image display apparatus 100 has been controlled based on the video and/or audio signal output by the output portion 350.

The output portion 350 may include a Light Emitting Diode (LED) module 351, a vibration module 353, an audio output module 355 and a display module 357. The LED module 351 may be turned on or off whenever the user input portion 330 is manipulated or whenever a signal is received from or transmitted to the image display apparatus 100 through the wireless communication module 320. The vibration module 353 may generate vibrations. The audio output module 355 may output audio data. The display module 357 may output video data.

The power supply 360 may supply power to the pointing device 301. If the pointing device 301 is kept stationary for a predetermined time or longer, the power supply 360 may, for example, reduce or cut off supply of power to the pointing device 301 in order to save power. The power supply 360 may resume the power supply when a specific key on the pointing device 301 is manipulated.

The memory 370 may store various application data for controlling or driving the pointing device 301. The pointing device 301 may wirelessly transmit signals to and/or receive signals from the image display apparatus 100 in a predetermined frequency band with the aid of the RF module 321. The controller 380 of the pointing device 301 may store information in the memory 370 regarding the frequency band used for the pointing device 301 to wirelessly transmit signals to and/or wirelessly receive signals from the image display apparatus 100 and may then refer to this information for later use.

The controller 380 may provide overall control to the pointing device 301. For example, the controller 380 may transmit a signal corresponding to a key manipulation detected from the user input portion 330 or a signal corresponding to a motion of the pointing device 301 sensed by the sensor portion 340, to the interface 150 of the image display apparatus 100.

The interface 150 may include a wireless communication module 311 that wirelessly transmits signals to and/or wirelessly receives signals from the pointing device 301, and a coordinate calculator 315 that calculates a pair of coordinates representing a position of the pointer 302 on the display screen that is to be moved in accordance with movement of the pointing device 301.

The wireless communication module 311 may include an RF module 312 and an IR module 313. The RF module 312 may wirelessly transmit RF signals to and/or wirelessly receive RF signals from the RF module 321 of the pointing device 301. The IR module 313 may wirelessly transmit IR signals to and/or wirelessly receive IR signals from the IR module 321 of the pointing device 301.

The coordinate calculator 315 may receive motion information regarding movement of the pointing device 301 from the wireless communication module 320 of the pointing device 301 and may calculate a pair of coordinates (x, y) representing a position of the pointer 302 on a screen of the display 180 by correcting the motion information for a user's handshake or possible errors.

A signal received in the image display apparatus 100 from the pointing device 301 through the interface 150 may be transmitted to the controller 160. The controller 160 may acquire information regarding the movement of pointing device 301 and information regarding a key manipulation detected from the pointing device 301 from the signal received from the interface 310, and may control the image display apparatus 100 based on the acquired information.

The image display apparatus 100, the remote controller 200, and the pointing device 301 being a kind of the remote controller 200 are shown in FIGS. 1 to 4 as having a number of components in a given configuration. However, the image display apparatus 100, the remote controller 200, and/or the pointing device 301 may include fewer components or additional components than those shown in FIGS. 1 to 4. Additionally, two or more components of the image display apparatus 100, the remote controller 200, and/or the pointing device 301 may be combined into a single component or a single component thereof may be separated into two more components. Functions of the components of the image display apparatus 100, the remote controller 200, and/or the pointing device 301 as set forth herein may be illustrative in nature and may be modified to satisfy, for example, the purposes of a given application.

Figure 5:
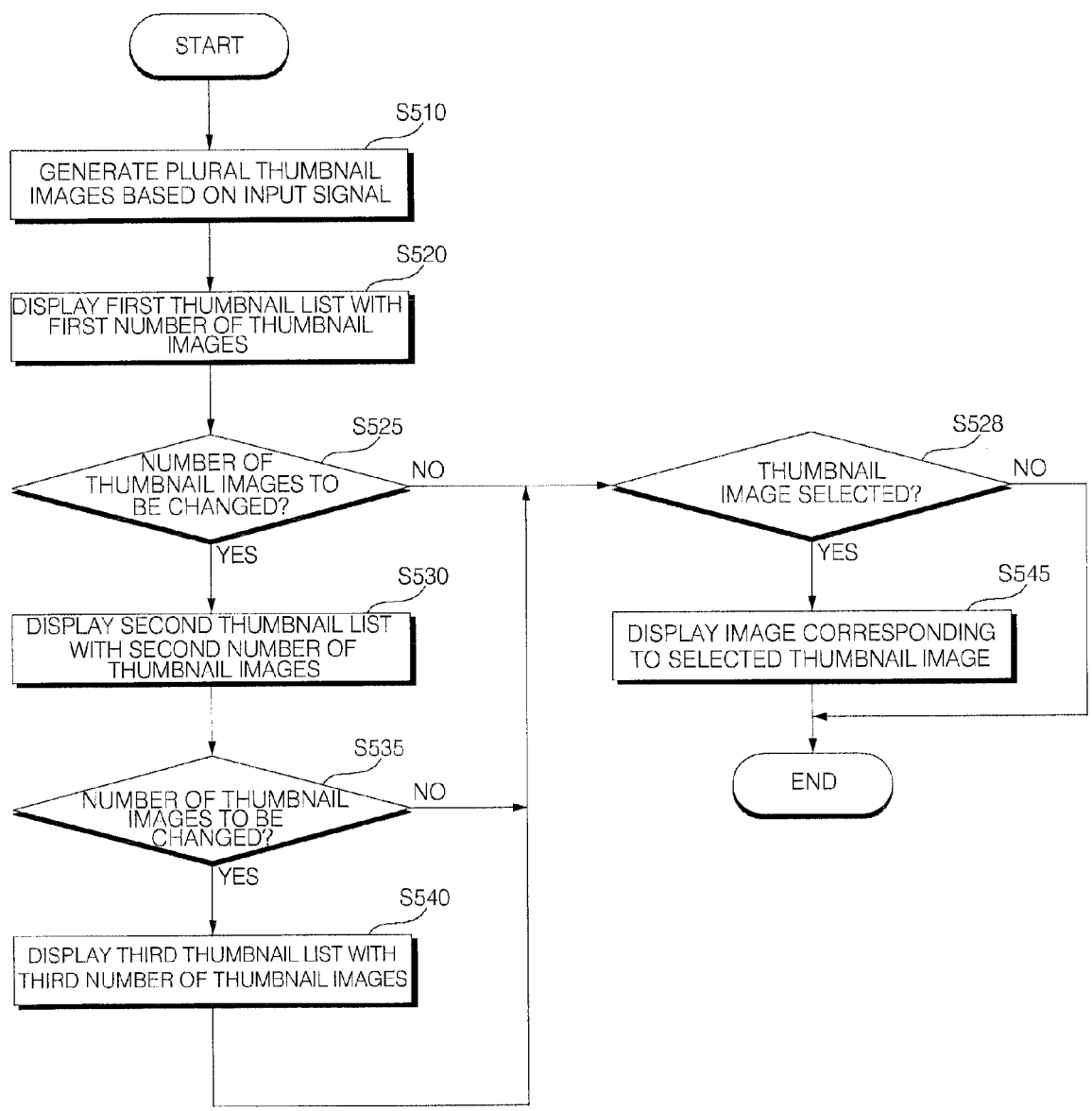
FIG. 5 is a flowchart of a method for operating an image display apparatus according to an exemplary embodiment of the present invention.

FIG. 5 is a flowchart of a method for operating an image display apparatus according to an exemplary embodiment of the present invention. Other operations, orders of operations and embodiments are also within the scope of the present invention.

As shown in FIG. 5, a plurality of thumbnail images may be generated based on an input signal in operation S510. The input signal may be a television signal, a broadcast signal, a cable signal, a satellite signal or an external input signal. The broadcast signal may include at least one of a broadcast signal received through an antenna, a broadcast signal received by cable, and/or an IPTV broadcast signal. For ease of description, the following may relate to a broadcast signal as the input signal, although other types of television signals may also be used.

Upon receipt of a channel list display command, the channel browsing processor 170 may generate (or provide) the plurality of thumbnail images based on the input broadcast signal.

The thumbnail images may be sequentially generated based on broadcast signals (or television signals) received on channels. That is, one thumbnail image may be created for each channel by sequentially scanning a plurality of channels.

Figure 7A:
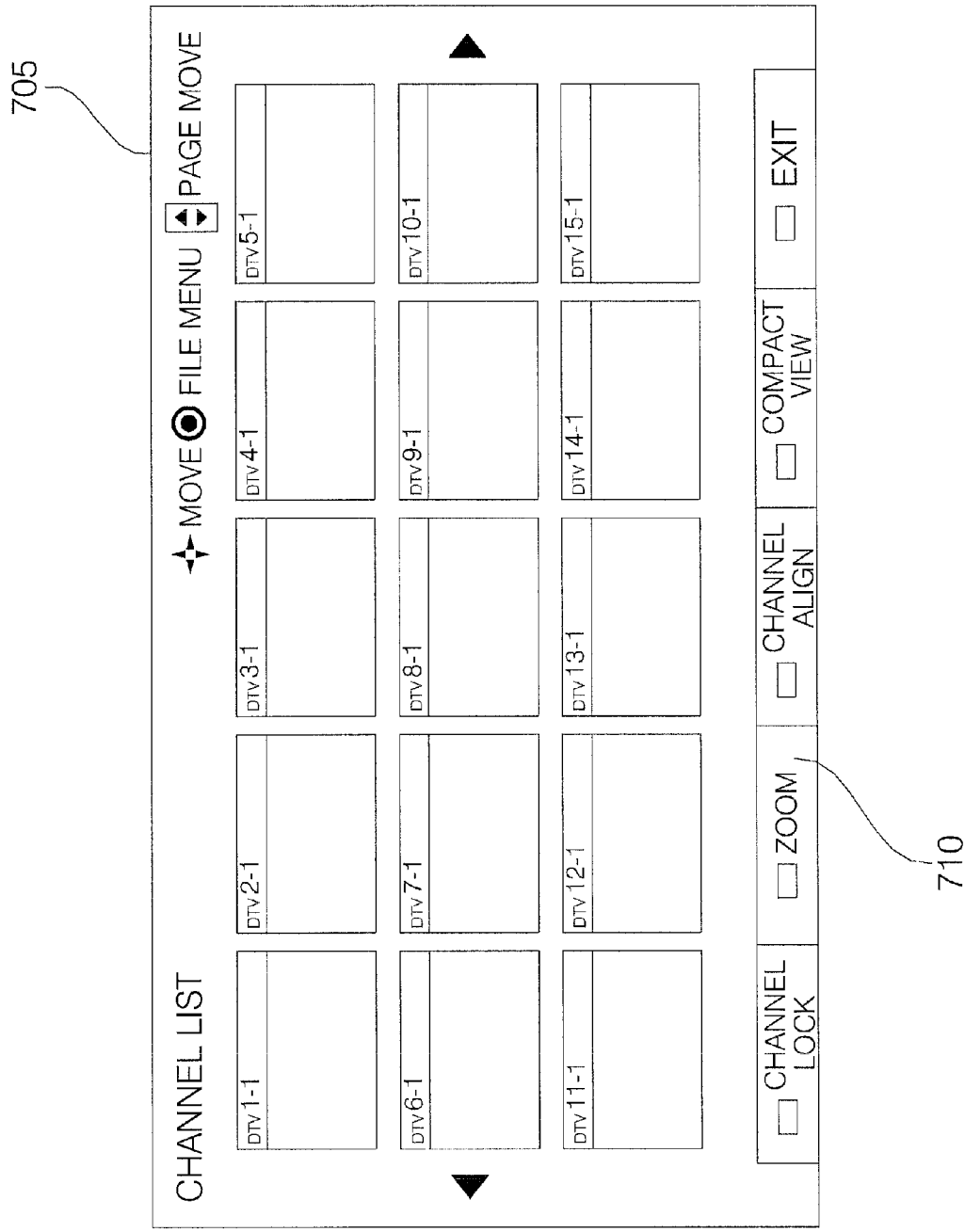
Figure 7B:
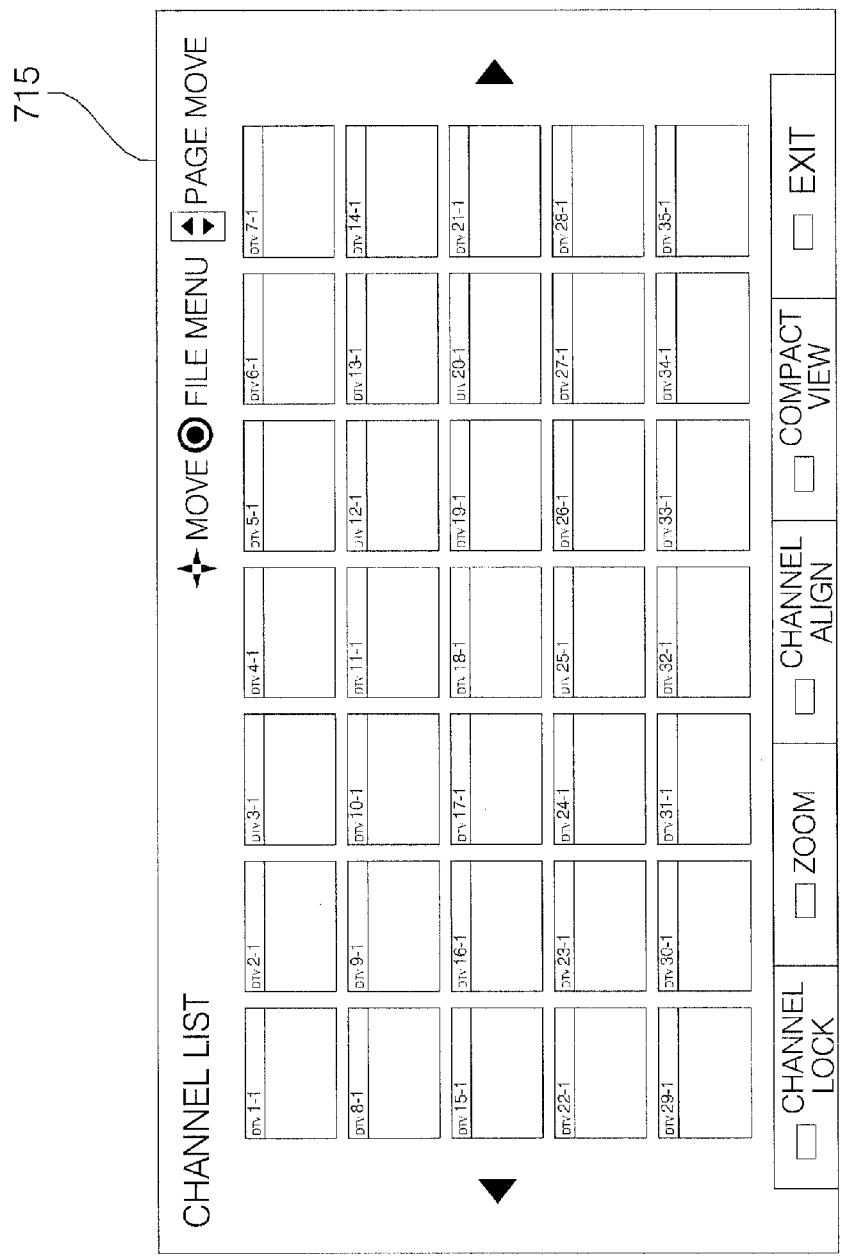
Figure 7C:
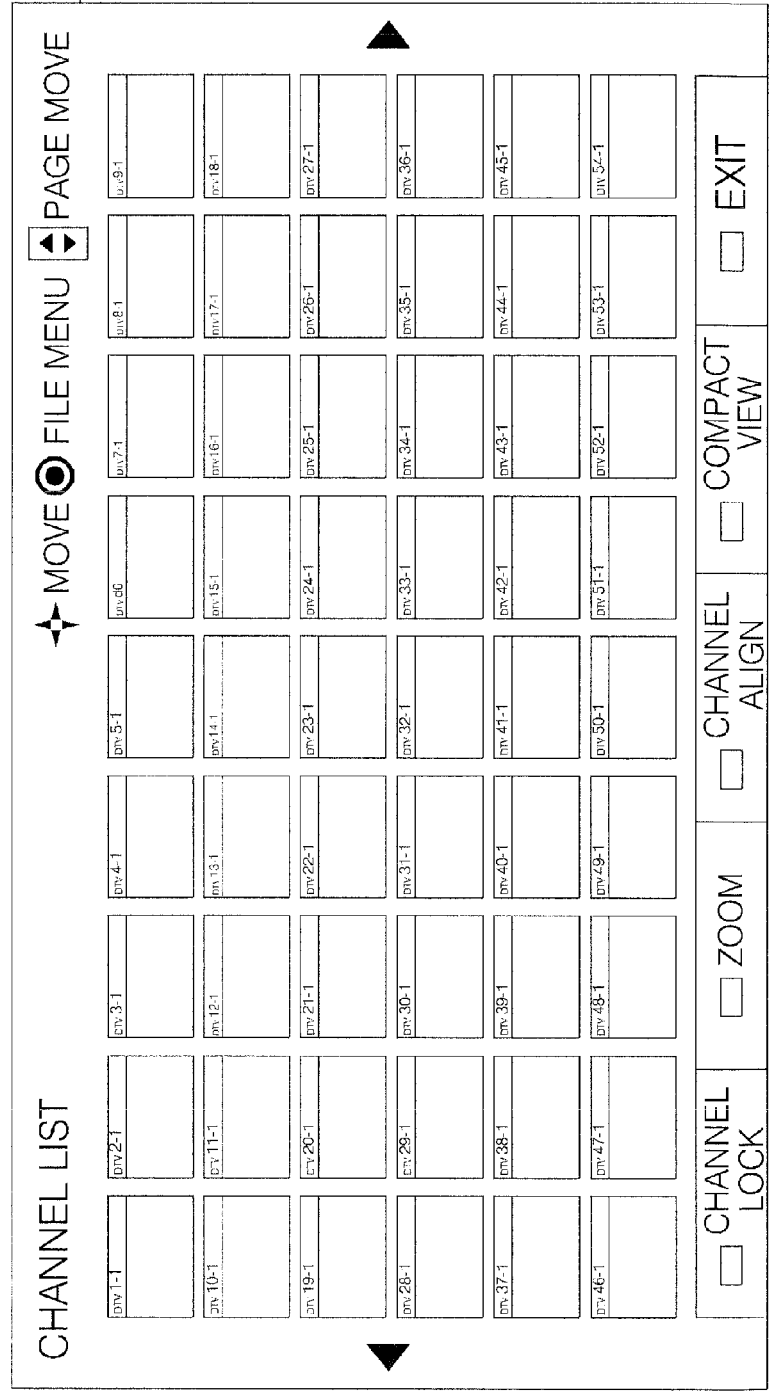

In operation S520, a first thumbnail list may be displayed, which may include a first number of thumbnail images. For example, as shown in FIG. 7(a), a first thumbnail list 705 with 15 thumbnail images may be displayed. The number of thumbnail images in the first thumbnail list 705 may be determined based on a total number of previously memorized channels or a number of previously memorized preferred channels. For example, if the total number of previously memorized channels is 15 or smaller, the first thumbnail list 705 may be displayed as shown in FIG. 7(a). If the total number of previously memorized channels is 16 to 35, a second thumbnail list 715 may be displayed as shown in FIG. 7(b). If the total number of previously memorized channels is 36 or larger, a third thumbnail list 725 may be displayed as shown in FIG. 7(c).

According to a user input, one of the first thumbnail list 705, the second thumbnail list 715 and the third thumbnail list 725 may be displayed.

Considering that thumbnail images are sequentially generated, a first thumbnail list with thumbnail images generated until a first time point may be displayed on the display 180.

Considering the sequential generation of thumbnail images, a second thumbnail list with thumbnail images generated until a second time point may be displayed on the display 180.

The controller 180 may process thumbnail lists with different numbers of thumbnail images. This may mean that a size of thumbnail images may be adjusted according to the number of thumbnail images to be displayed. Alternatively, the channel browsing processor 170 may perform this function.

In operation S525, a determination may be made whether the number of thumbnail images is to change. If a change is to occur to the number of thumbnail images, a second thumbnail list with a second number of thumbnail images may be displayed in operation S530.

The determination may be automatically made as to whether to change the number of thumbnail images according to a user input, the number of generated thumbnail images, and/or a time point.

For example, if a command to change the number of thumbnail images is received from the user, specifically when a menu item 710 "ZOOM" shown in FIG. 7(a) is selected, the second thumbnail list 715 with 35 thumbnail images may be displayed as shown in FIG. 7(b).

In operation S535, a determination may be made whether the number of thumbnail images is to change. If a change is to occur to the number of thumbnail images, a third thumbnail list with a third number of thumbnail images may be displayed in operation S540.

For example, if a command to change the number of thumbnail images is received from the user, specifically when the menu item "ZOOM" shown in FIG. 7(b) is selected, the third thumbnail list 725 with 54 thumbnail images may be displayed as shown in FIG. 7(c).

If there is not any further change in the number of thumbnail images after the first, second or third thumbnail list may be displayed, upon selection of a specific thumbnail image in operation S528, an image corresponding to the selected thumbnail image may be displayed on the display in operation S545.

The thumbnail images may be still images or moving pictures.

FIG. 6 illustrates an example of displaying channel lists (or video channel lists).

Figure 6A:
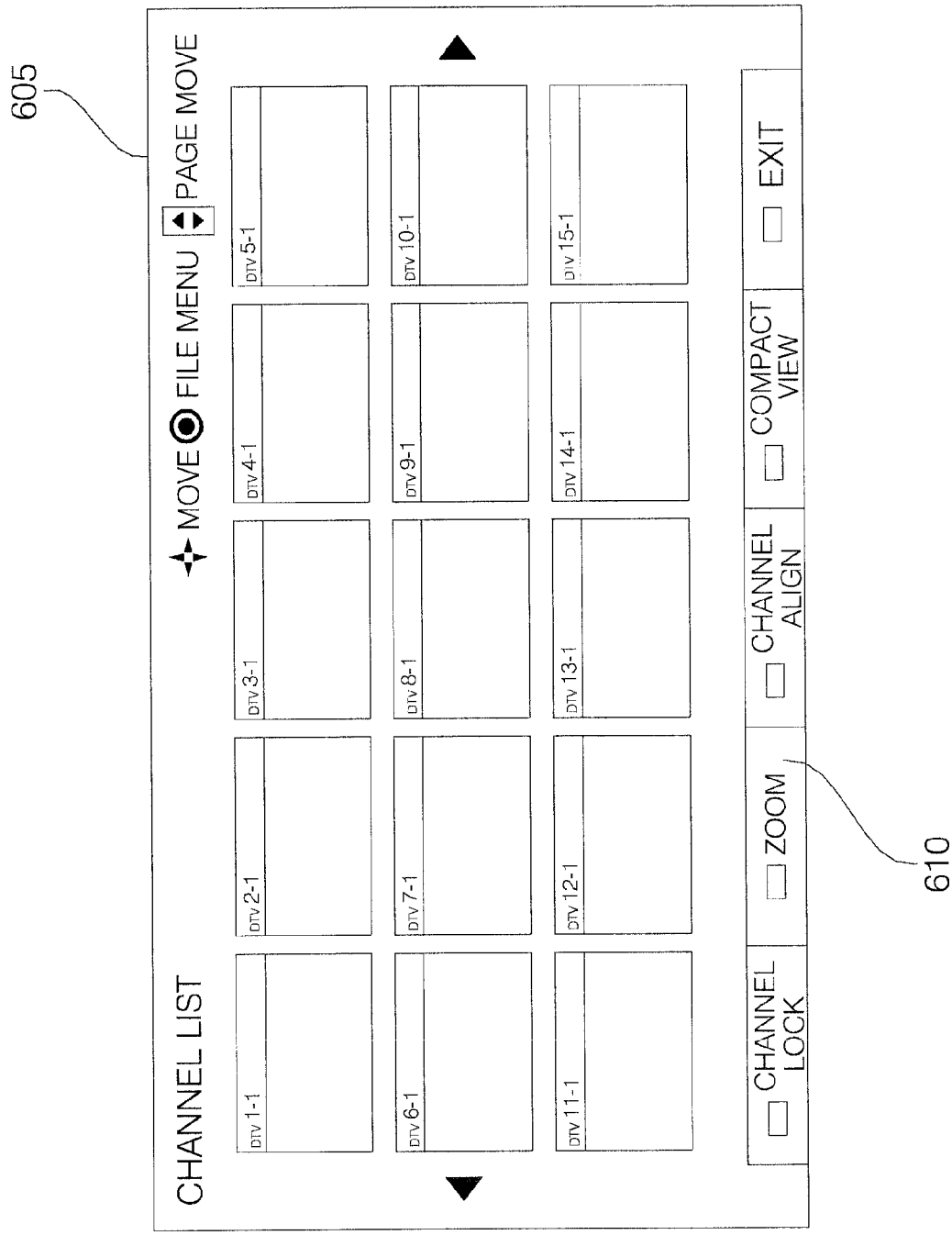
FIGS. 6A to 9 illustrate examples of displaying channel lists according to exemplary embodiments of the present invention.

As shown in FIG. 6(a), when a channel list display command is issued, a first thumbnail list 605 with thumbnail images corresponding to broadcast signals (or television signals) received on channels may be displayed on the display 180. A text "Channel list" may be displayed in an upper part of the display 180, for example. While the first thumbnail list 605 is displayed across an entire area of the display 180 in the full-view mode in FIG. 6(a), embodiments of the present invention are not so limited. The above described compact-view mode may also display the first thumbnail list 605.

From the first thumbnail list 605 with a plurality of thumbnail images displayed on the display 180, the user may intuitively recognize contents broadcast on different channels.

For ease of illustration, the first thumbnail list 605 is shown to have 15 thumbnail images in FIG. 6(a). For example, if a list of 15 broadcast channels has been preliminarily memorized, the number of thumbnail images included in the first thumbnail list 605 may be automatically set to 15. The preliminarily memorized channel list may be a list of total broadcast channels, although embodiments of the present invention are not so limited. A list of preferred channels may be a previously memorized list.

A determination may be made of the number of thumbnail images to be included in the first thumbnail list 605 based on a latest list of thumbnail images displayed on the display 180. For example, if the latest displayed thumbnail list is the first thumbnail list 605 with 15 thumbnail images, the first thumbnail list 605 may be immediately displayed on the display 180 upon receipt of the channel list display command.

When a command to move the cursor or the pointer is issued with the first thumbnail list 605 displayed on the display 180, the cursor or the pointer moves up, down, to the left or to the right in accordance with the command. If a specific item is selected after the cursor or the pointer has moved, an operation corresponding to the selected item is performed. The movement of the cursor or the pointer and the item selection may be implemented by input of a directional key and a selection key of a remote controller (or a pointing device), and/or an operation input and a selection input of a pointing device.

The first thumbnail list 605 displayed on the display 180 may include an edit menu based on the displayed thumbnail images. As shown in FIG. 6(a), the edit menu may include menu items 610, such as "Channel Lock", "Zoom", "Channel align", "Compact View", and "Exit" at a bottom of the display 180, for example. A selected thumbnail image may be locked by Channel Lock so that it may not be edited, a thumbnail image or a thumbnail list may be displayed in an enlarged or reduced manner by Zoom, thumbnail images may be displayed in order by Channel align, an image of a selected channel may be displayed in a part of the display 180, while thumbnail images may be displayed in another part of the display 180 by Compact View, and the user may move from "Channel list" to another menu by Exit. The edit menu may further include menu items "Edit" (not shown) for editing a selected thumbnail image, "Previous" (not shown) for displaying a thumbnail list previous to the displayed thumbnail list, and/or "Next" (not shown) for displaying a thumbnail list following the displayed thumbnail list.

Figure 6B:
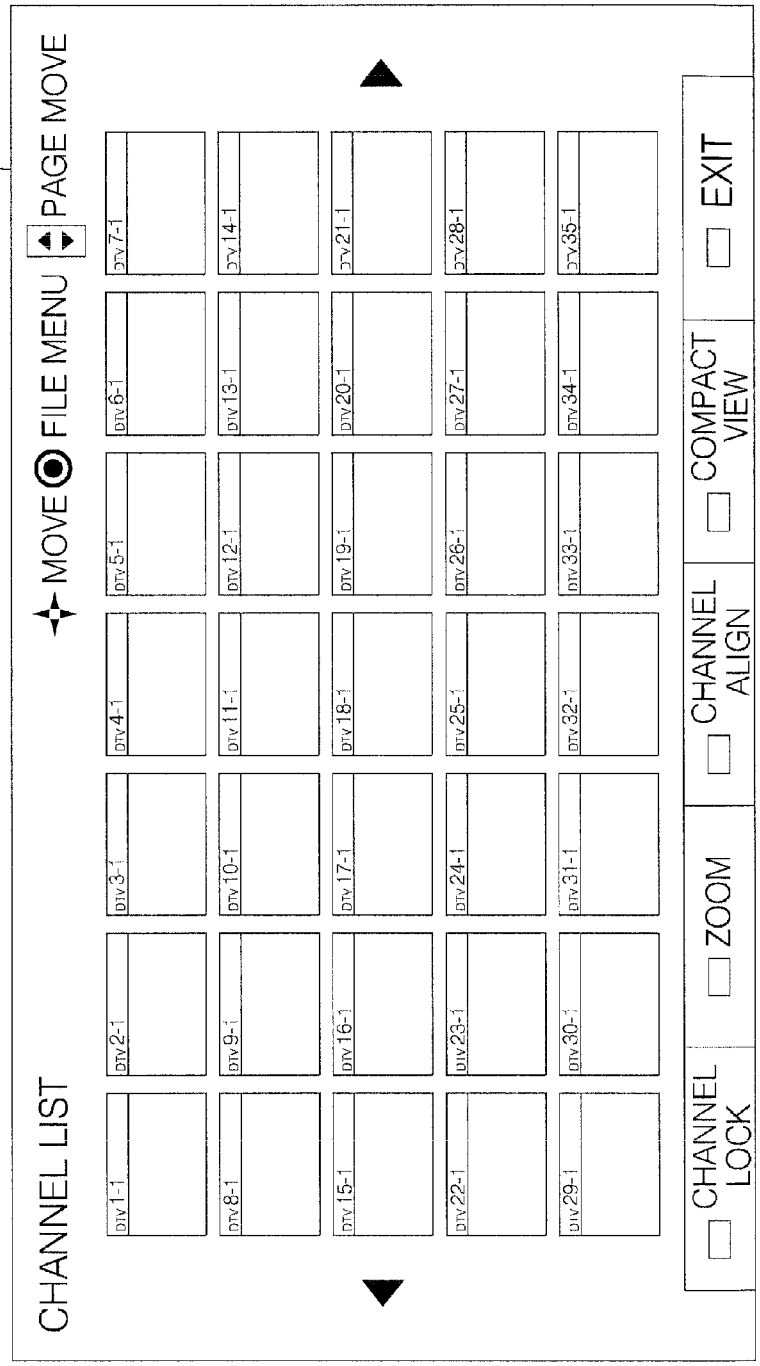

When the menu item "ZOOM" is selected from among the menu items shown in FIG. 6(a), which implies that a command to change the number of displayed thumbnail images is issued, the first thumbnail list 605 may be replaced with a second thumbnail list 615 on the display 180 as shown in FIG. 6(b). The second thumbnail list 615 may have 35 thumbnail images, for example. The selection of the menu item "ZOOM", accurately "ZOOM-OUT" may lead to displaying of more thumbnail images on the display 180. The number of thumbnail images displayed on the display 180 may also decrease by selecting a menu item "ZOOM-IN". Upon receipt of a command to change the number of thumbnail images, the number of thumbnail images displayed on the display 180 may change. The size of the displayed thumbnail images may also change.

The thumbnail images of the thumbnail lists 605 and 615 shown in FIG. 6 may be still images or moving pictures. While specific images are not shown in FIG. 6, thumbnail images corresponding to channels may be displayed in the thumbnail lists 605 and 615. The displayed thumbnail images may be images currently being received or preliminarily stored images. These thumbnail images may be images that have been processed and extracted by the channel browsing processor 170.

With the first thumbnail list 605 or the second thumbnail list 610 displayed on the display 180, if a thumbnail image is selected, a broadcast signal (or television signal) of a channel corresponding to the selected thumbnail image may be displayed on the display 180.

With the first thumbnail list 605 or the second thumbnail list 610 displayed on the display 180, a thumbnail image may be displayed focused by positioning the cursor or the pointer over the thumbnail image, highlighting the thumbnail image, and/or enlarging the thumbnail image. Additionally, program information corresponding to the focused thumbnail image may be displayed.

Upon receipt of an edit command with the first thumbnail list 605 or the second thumbnail list 610 displayed on the display 180, a broadcast signal corresponding to the selected thumbnail image may be registered as "preferred", "deleted", "locked", etc.

Upon receipt of a next or previous screen display command with the first thumbnail list 605 or the second thumbnail list 610 displayed on the display 180, the next or previous screen may be displayed, dragged, scrolled and/or rotated three-dimensionally.

With the first thumbnail list 605 or the second thumbnail list 610 displayed on the display 180, at least part of thumbnail images corresponding to received broadcast signals (or television signals) may be updated. Thus, the first thumbnail list 605 or the second thumbnail list 615 may include at least one updated thumbnail image and may be displayed on the display 180. The update may be periodically or randomly carried out and all or part of thumbnail images may be updated. A thumbnail image corresponding to an invalid channel may be excluded from the update. The updated thumbnail image may be based on an image updated by the channel browsing processor 170.

FIGS. 7(*a*)-7(*c*) illustrate examples of displaying channel lists.

Channel lists may be displayed almost in the same manner as FIG. 6. When a menu item 710 "ZOOM" is selected with the first thumbnail list 705 with 15 thumbnail images displayed on the display 180 in FIG. 7(*a*), the second thumbnail list 715 with 35 thumbnail images may be displayed. Upon selection of the menu item "ZOOM" again with the second thumbnail list 715 displayed on the display 180 in FIG. 7(*b*), the third thumbnail list 725 with 54 thumbnail images may be displayed on the display 180 as shown in FIG. 7(*c*).

If the menu item 710 "ZOOM" is selected twice with the first thumbnail list 705 with 15 thumbnail images displayed on the display 180 in FIG. 7(*a*), the second thumbnail list 715 and the third thumbnail list 725 may be sequentially displayed on the display 180.

Upon receipt of the channel list display command, if 15 or fewer channels have been preliminarily memorized, the first thumbnail list 705 may be immediately displayed. If 16 to 35 channels have been preliminarily memorized, the second thumbnail list 715 may be immediately displayed. If 36 or more channels have been preliminarily memorized, the third thumbnail list 715 may be immediately displayed.

The user may recognize a large number of channels and may easily select a channel from among the channels.

While specific numbers of thumbnail images are included in the thumbnail lists in FIGS. 6 and 7, embodiments of the present invention are not so limited to the specific numbers. Rather, a thumbnail list may be configured to include any other number of thumbnail images.

Figure 8A:
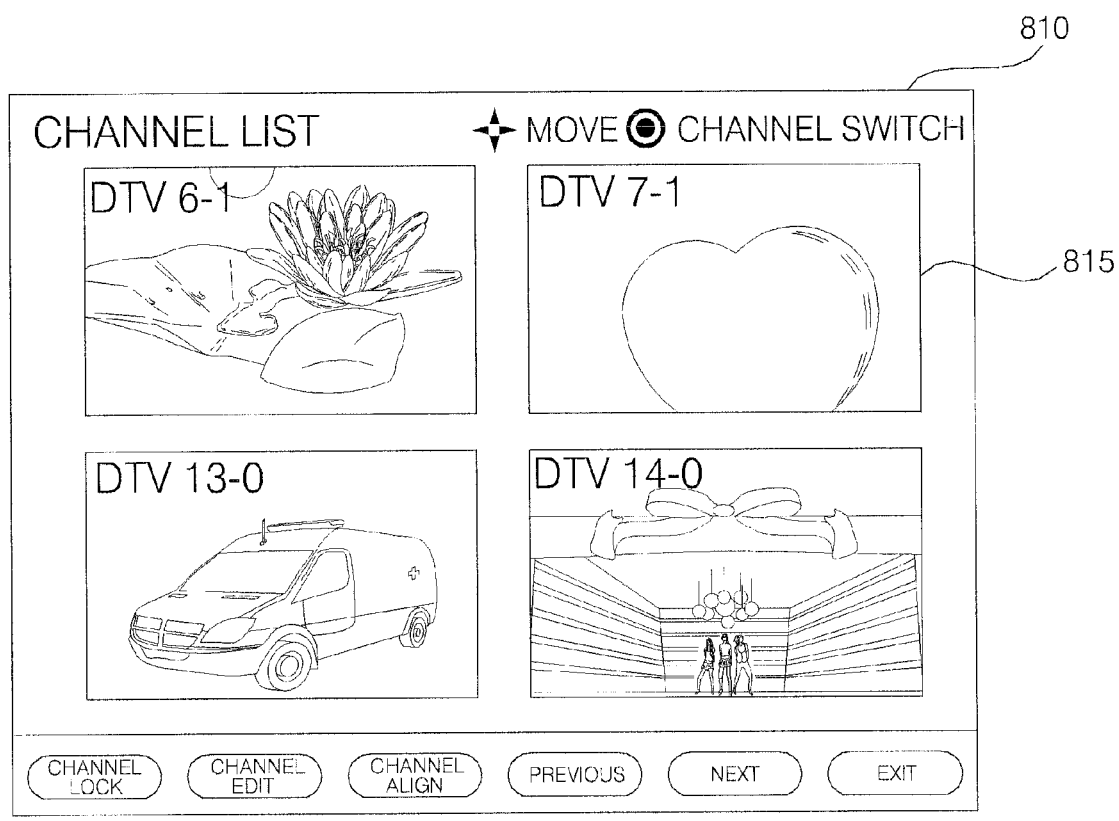
Figure 8B:
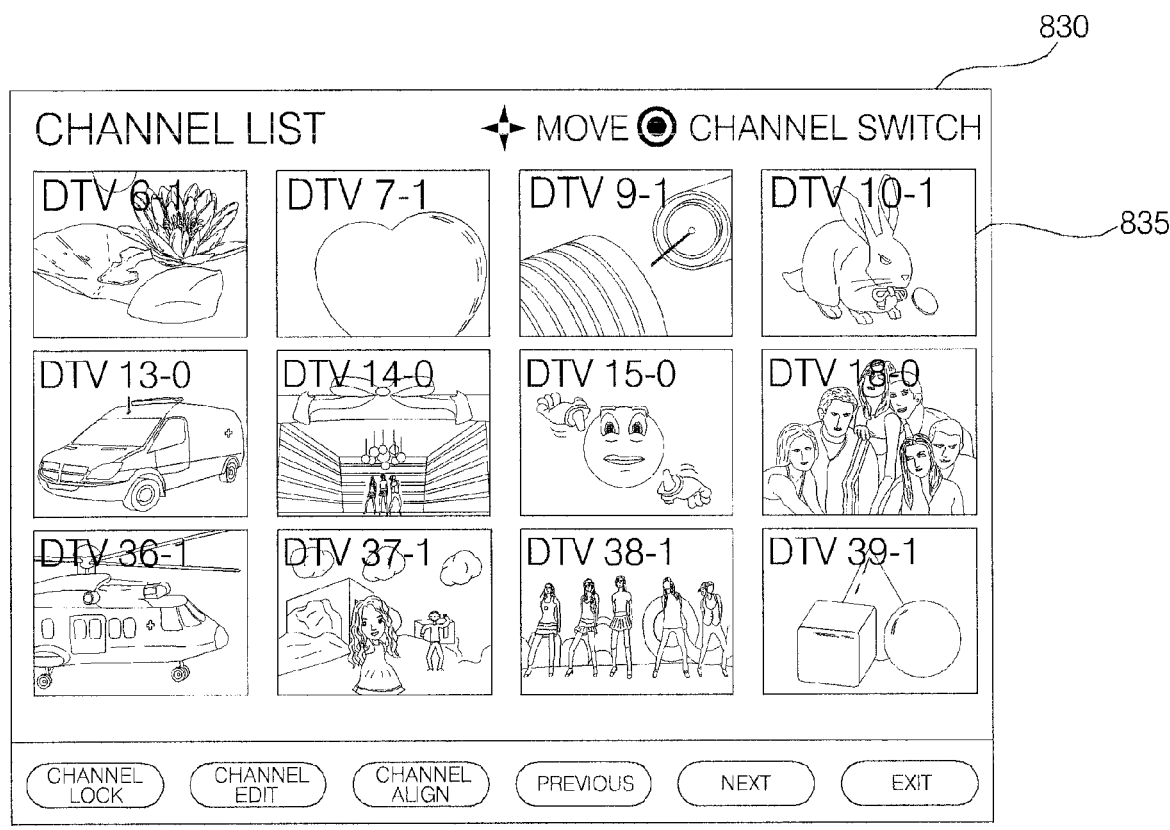
Figure 8C:
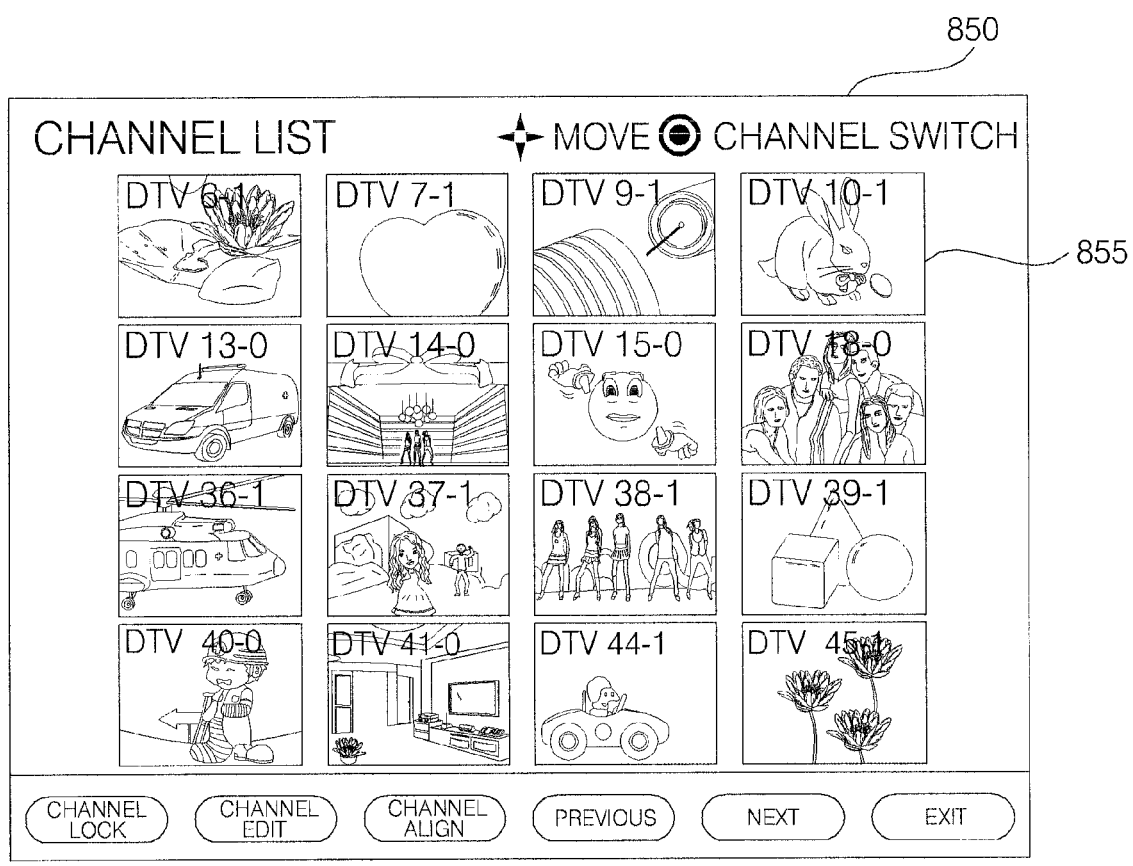

FIGS. 8(*a*)-8(*c*) illustrate another example of displaying channel lists.

A first thumbnail list 810 with thumbnail images 815 generated until a first time point may be displayed on the display 180 in FIG. 8(*a*). Subsequently, a second thumbnail list 830 with thumbnail images 835 generated until a second time point may substitute for the first thumbnail list 810 on the display 180 in FIG. 8(*b*). The first thumbnail list 810 and the second thumbnail lists 830 may include 4 and 12 thumbnail images, respectively. Neither a thumbnail image that is yet to be generated nor a thumbnail image corresponding to an invalid channel may be included in the first thumbnail list 810 or the second thumbnail list 830.

Even though some of the thumbnail images corresponding to predetermined channels have not yet been generated or provided, a thumbnail list may be configured to include only generated thumbnail images without leaving areas empty for the thumbnail images that are yet to be generated as shown in FIGS. 8(*a*) and 8(*b*), thereby saving area that might otherwise be wasted unnecessarily in the thumbnail list.

Considering that the user requests a thumbnail list to find out available channels by thumbnail images, an area left empty without a thumbnail image may distract the user's attention without providing any information to the user. Thumbnail images generated over time may be displayed, without displaying the other images, thereby increasing user convenience.

Due to elimination of an unnecessary area, the size of each thumbnail image may change. That is, the method for operating the image display apparatus may be characterized in that the size of thumbnail images in the first thumbnail list or the second thumbnail list may be determined according to the number of thumbnail images included in the first thumbnail list or the second thumbnail list. As the size of thumbnail images in a thumbnail list as well as the number of thumbnail images in the thumbnail list may be automatically adjusted, various UIs may be implemented.

The number of thumbnail images included in the first thumbnail list or the second thumbnail list may be inversely proportional to the size of the thumbnail images. That is, as more thumbnail images are included in a thumbnail list, thumbnail images may be smaller. In case of a smaller number of thumbnail images, the thumbnail images may be displayed larger and thus the user may easily recognize the thumbnail images.

The thumbnail images of the first thumbnail list may be larger than the thumbnail images of the second thumbnail list. In the first thumbnail list, the thumbnail images may be larger when they are initially displayed, and then may gradually become smaller.

The first thumbnail list may include fewer thumbnail images than the second thumbnail list.

As shown in FIG. 8(*c*), the method for operating the image display apparatus may further include displaying a third thumbnail list 850 with thumbnail images 855 generated until a third time point. The third thumbnail list 850 may have 16 thumbnail images, except for thumbnail images that are yet to be generated or except for thumbnail images that are for invalid broadcast channels.

When it takes a certain time to display an initial thumbnail list upon power-on of the image display apparatus 100, embodiments of the present invention may be preferably applied upon the power-on. Since the number and size of thumbnail images are changed in the thumbnail list, the user may feel less bored.

If all possible thumbnail images have been generated until the first time point, the first thumbnail list may be identical to the second thumbnail list including thumbnail images generated until the second time point.

The first time point may be spaced from the second time point by a predetermined time interval, or the first time point and the second time point may be successive.

The input broadcast signals based on which the thumbnail images are created (or provided) may be broadcast signals (or television signals) received on previously memorized channels. A list of previously memorized channels may be a list of total available broadcast channels, although embodiments of the present invention are not so limited. A list of preferred channels may be the list of previously memorized channels. Thumbnail images may be generated or provided according to a channel list stored in a channel map. Thumbnail images may also be generated or provided by scanning broadcast channels listed in the preferred channel list.

The thumbnail images may be still images or moving pictures. Images currently being received or preliminarily stored images may be displayed as thumbnail images. While a thumbnail list is displayed on the display 180, at least part of the thumbnail images corresponding to received broadcast signals may be updated.

The first and/or second thumbnail list may be displayed across the entire area of the display 180 as shown in FIG. 8.

The thumbnail list may include a thumbnail image preliminarily registered as deleted. This thumbnail image may be distinguished from another thumbnail image by displaying the thumbnail image differently in at least one of brightness, contrast, fade in/out, and/or transparency.

Figure 9:
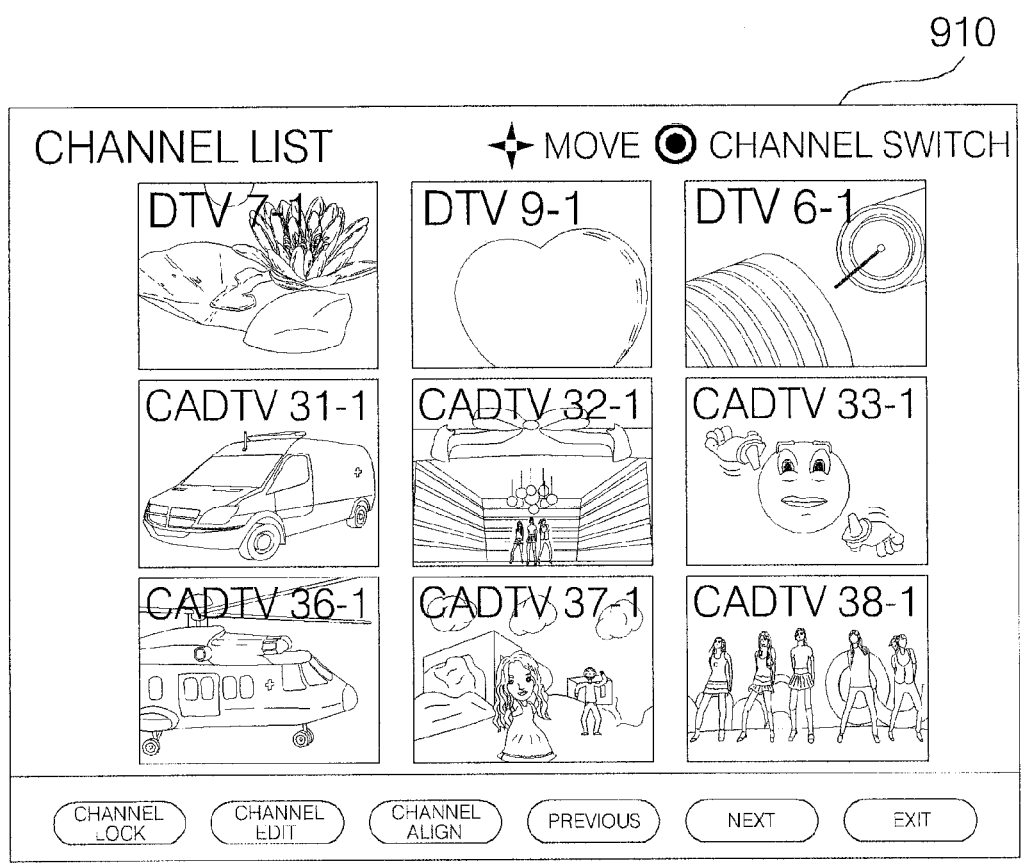

FIG. 9 illustrates an example of displaying a channel list.

As shown in FIG. 9, although a thumbnail list to be displayed on the display 180 is supposed to include 54 thumbnail images, 9 thumbnail images may be generated and thus a thumbnail list 910 with the 9 thumbnail images may be displayed. The 9 thumbnail images may be adjusted in size. The size adjustment may be made on an individual thumbnail image basis or uniformly for all thumbnail images.

The thumbnail list may be configured to include only thumbnail images corresponding to broadcast signals of valid broadcast channels (or valid television signals).

For example, while contents from various input sources such as terrestrial broadcasting, cable broadcasting, Internet TV, etc. may be available to the image display apparatus 100, some contents may be unavailable according to whether the user is authorized to receive a service or has subscribed to a paid channel. Thumbnail images corresponding to the unavailable contents may not be created. Some contents of the input signals may be invalid according to a user's reception environment. Since certain display areas may be allocated for a thumbnail image that is yet to be generated and a thumbnail image corresponding to a channel unavailable to the user, the display areas of a thumbnail list may not be efficiently utilized.

It may occur that a number of valid broadcast channels may be smaller than a default number of thumbnail images to be displayed according to a use area or a user's subscription or non-subscription to a specific service. A thumbnail list may be formed only with valid channels.

In case where thumbnail images are distinguished from one another according to whether they are for terrestrial broadcasting or cable broadcasting, and/or according to whether they are for analog channels or digital channels, for example, when a thumbnail list for terrestrial digital channels is displayed on the display, if the number of the channels is smaller than a preset number of thumbnail images in a thumbnail list, the thumbnail list may be displayed including as many thumbnail images as the number of valid channels. If the user receives only terrestrial broadcasting, only a few channels may be available to the user and thus a thumbnail list including thumbnail images corresponding to the valid channels only may be displayed.

The number of thumbnail images in a thumbnail list may be automatically adjusted according to a reception environment of the user. The size of thumbnail images may be controlled based on the number of the thumbnail images.

An operation method of an image display apparatus may be implemented as code that may be written on a computer-readable recording medium and may thus be read by a processor. The computer-readable recording medium may be any type of recording device in which data is stored in a computer-readable manner.

Examples of the computer-readable recording medium may include a ROM, a RAM, a CD-ROM, a magnetic tape, a floppy disc, an optical data storage, and/or a carrier wave (e.g., data transmission through the internet). The computer-readable recording medium may be distributed over a plurality of computer systems connected to a network so that computer-readable code is written thereto and executed therefrom in a decentralized manner. Functional programs, code, and/or code segments needed for realizing embodiments herein may be construed by one of ordinary skill in the art.

According to at least one exemplary embodiment, thumbnail images may be generated based on an input signal and thumbnail lists each having a different number of thumbnail images may be displayed. Therefore, a user may easily select a channel.

A thumbnail list may be displayed, which may include thumbnail images corresponding to received broadcast signals. Thus, the user may intuitively identify broadcast signals received on channels.

Since the number of thumbnail images to be included in a thumbnail list may depend on the number of generated thumbnails or the number of valid channels, the resulting elimination of unnecessary display areas may lead to displaying an optimized thumbnail list.

The size of thumbnail images may be adjusted due to the area saving in the thumbnail list. Therefore, the user may intuitively identify images of broadcast signals received on channels by the resulting enlarged thumbnail images.

Various UIs can be utilized with a displayed thumbnail list.

Embodiments may provide an image display apparatus and a method for operating an image display apparatus that enables a user to easily select a channel.

A method may be provided for operating an image display apparatus. This may include generating a plurality of thumbnail images based on an input signal, displaying a first thumbnail list including a first number of thumbnail images from among the generated thumbnail images, and displaying a second thumbnail list including a second number of thumbnail images from among the generated thumbnail images, the second number being different from the first number.

An image display apparatus may include a display, a channel browsing processor for generating or providing a plurality of thumbnail images based on an input signal, and a controller for controlling a first thumbnail list including a first number of thumbnail images from among the generated thumbnail images to be displayed on the display, and for controlling a second thumbnail list including a second number of thumbnail images from among the generated thumbnail images to be displayed on the display, the second number being different from the first number.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing thumbnail images for a display, comprising:
   generating a plurality of thumbnail images based on television channels that have been tuned;
   providing a channel list that includes the plurality of thumbnail images generated until a first time point for output to the display;
   generating at least one additional thumbnail image based on at least one additional television channel that has been tuned;
   updating the channel list to further include the at least one additional thumbnail image in addition to the plurality of thumbnail images; and
   providing the updated channel list that includes the plurality of thumbnail images and further includes the at least one additional thumbnail image generated until a second time point to the display, the second time point being a time subsequent to the first time point,
   wherein the providing of the updated channel list is automatically performed at the second time point without a command to change a number of displayed thumbnail images.

2. The method according to claim 1, wherein generating the at least one additional thumbnail image, updating the channel list and providing the updated channel list are repeated until a preset number of thumbnail images are provided in the channel list.

3. The method according to claim 1, wherein generating the at least one additional thumbnail image, updating the channel list and providing the updated channel list are repeated until all valid channels that can be tuned are provided in the channel list regardless of a preset number of thumbnail images required for the channel list.

4. The method according to claim 1, wherein the channel list includes only available channels.

5. The method according to claim 1, wherein the channel list and the updated channel list do not include a thumbnail image that is yet to be generated or a thumbnail image corresponding to an invalid channel.

6. The method according to claim 1, wherein the channel list and the updated channel list include a thumbnail image preliminarily registered as deleted, and
   wherein the registered thumbnail image is distinguished from another thumbnail image by displaying the registered thumbnail image differently in at least one of brightness, contrast, fade in/out, or transparency.

7. The method according to claim 1, wherein providing the channel list includes determining a first number of thumbnail images according to a number of preliminarily stored broadcast channels and providing the thumbnail list including the first number of thumbnail images.

8. The method according to claim 1, wherein the plurality of thumbnail images and the at least one additional thumbnail image are adjusted in size, and
   wherein the size adjustment is made based on an individual thumbnail image.

9. The method according to claim 1, wherein the channel list includes a first number of thumbnail images, and the updated channel list includes a second number of thumbnail images.

10. The method according to claim 9, wherein a size of the first number of thumbnail images is determined according to the first number and a size of the second number of thumbnail images is determined according to the second number.

11. The method according to claim 9, wherein the first number of thumbnail images in the first thumbnail list are larger in size than the second number of thumbnail images in the second thumbnail list.

12. The method according to claim 9, wherein at least one of the first and second thumbnail lists include thumbnail images corresponding to valid channels.

13. The method according to claim 9, wherein the first number of thumbnail images and the second number of thumbnail images are still images or moving pictures.

14. The method according to claim 1, wherein providing the channel list includes providing a latest displayed thumbnail list.

15. The method according to claim 1, wherein the updating of the channel list comprises updating only a thumbnail image corresponding to a valid channel, excluding a thumbnail image corresponding to an invalid channel from the update.

16. An image display apparatus, comprising:
   a display;
   a channel browsing processor for providing a plurality of thumbnail images based on television channels that have been tuned until a first time point, the channel browsing processor for generating at least one additional thumbnail image based on at least one additional television channel that has been tuned until a second time point, the second time point being a time subsequent to the first time point;
   a controller for providing a channel list that includes the plurality of thumbnail images generated until the first time point for output to the display, the controller for updating the channel list to further include the at least one additional thumbnail image generated until a second time point in addition to the plurality of thumbnail images, and the controller for providing the updated channel list for output to the display such that the display displays the plurality of thumbnail images and the at least one additional thumbnail image,
   wherein the controller updating the channel list is automatically performed at the second time point without a command to change a number of displayed thumbnail images.

17. The image display apparatus according to claim 16, wherein the controller updates the channel list until a preset number of thumbnail images are provided in the updated channel list.

18. The image display apparatus according to claim 16, wherein the controller updates the channel until all valid channels that can be tuned are provided in the channel list regardless of a preset number of thumbnail images required for the channel list.

19. The image display apparatus according to claim 16, wherein the channel list and the updated channel list do not include a thumbnail image that is yet to be generated or a thumbnail image corresponding to an invalid channel.

20. The image display apparatus according to claim 16, further comprising:
   a receiver for receiving a television signal on a selected channel; and an external signal input portion for receiving an external signal from an external device.

21. The image display apparatus according to claim 16, wherein the channel list includes a first number of thumbnail images, and the updated channel list includes a second number of thumbnail images.

22. The image display apparatus according to claim 21, wherein a size of the first number of thumbnail images is determined according to the first number and a size of the second number of thumbnail images is determined according to the second number.

23. The image display apparatus according to claim 21, wherein the first number of thumbnail images in the first thumbnail list are larger in size than the second number of thumbnail images in the second thumbnail list.

24. The image display apparatus according to claim 16, wherein the channel list and the updated channel list include a thumbnail image preliminarily registered as deleted, and
wherein the registered thumbnail image is distinguished from another thumbnail image by displaying the registered thumbnail image differently in at least one of brightness, contrast, fade in/out, or transparency.

25. The image display apparatus according to claim 16, wherein the plurality of thumbnail images and the at least one additional thumbnail image are adjusted in size, and
wherein the size adjustment is made based on an individual thumbnail image.

* * * * *